United States Patent
Yebka et al.

(10) Patent No.: US 11,063,306 B2
(45) Date of Patent: Jul. 13, 2021

(54) LITHIUM-ION BATTERY CUT-OFF VOLTAGE ADJUSTMENT

(71) Applicant: Lenovo (Singapore) Pte. Ltd., Singapore (SG)

(72) Inventors: Bouziane Yebka, Apex, NC (US); Joseph Anthony Holung, Wake Forest, NC (US); Tin-Lup Wong, Chapel Hill, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 328 days.

(21) Appl. No.: 15/619,514

(22) Filed: Jun. 11, 2017

(65) Prior Publication Data

US 2018/0358661 A1    Dec. 13, 2018

(51) Int. Cl.
| | |
|---|---|
| *H01M 10/42* | (2006.01) |
| *H01M 10/44* | (2006.01) |
| *H02J 7/00* | (2006.01) |
| *H01M 50/572* | (2021.01) |
| *H01M 10/0525* | (2010.01) |
| *H01M 10/48* | (2006.01) |

(52) U.S. Cl.
CPC ..... *H01M 10/425* (2013.01); *H01M 10/0525* (2013.01); *H01M 10/44* (2013.01); *H01M 10/48* (2013.01); *H01M 50/572* (2021.01); *H02J 7/0026* (2013.01); *H02J 7/00716* (2020.01); *H01M 2010/4271* (2013.01); *H01M 2200/00* (2013.01); *H01M 2220/20* (2013.01); *H02J 7/00306* (2020.01); *H02J 7/007192* (2020.01)

(58) Field of Classification Search
CPC .. H01M 10/425; H01M 50/572; H01M 10/44; H02J 7/00716; H02J 7/0031; H02J 7/0063; H02J 2007/0067
See application file for complete search history.

(56) References Cited

U.S. PATENT DOCUMENTS

| | | |
|---|---|---|
| 4,902,956 A | 2/1990 | Sloan |
| 7,072,871 B1 | 7/2006 | Tinnemeyer |
| 2008/0055311 A1* | 3/2008 | Aleksic ............ G06T 15/00 345/428 |
| 2008/0309289 A1 | 12/2008 | White et al. |
| 2015/0022160 A1 | 1/2015 | Greening et al. |
| 2015/0236383 A1 | 8/2015 | Koller et al. |

OTHER PUBLICATIONS

Cutoff voltage, Wikipedia Online Encyclopedia, en.wikipedia.org/wiki/Cutoff_voltage (May 2017) (1 page).
Rubino, D., Flow to generate a Battery Report in Windows 10, https://www.windowscentral.com/generate-battery-report-windows-10, Feb. 18, 2016 (23 pages).
Soneira, R.M., DisplayMate Technologies Corporation, iPhone 6 Display Technology Shoot-Out, 2014 (13 pages).
Linear Technology, LTC2990, Quad I2C Voltage, Current and Temperature Monitor, LT 1116 REV E, 2010 (26 pages).
Linear Technology, LTC4151, High Voltage I2C Current and Voltage Monitor, LT 0314 REV F, 2008 (18 pages).
Microchip Technology, Inc., MCP73841/2/3/4, Advanced Single or Dual Cell Lithium-Ion/Lithium-Polymer Charge Management Controllers, 2004 (24 pages).
GB Application No. 1809543.0, Search & Exam Report, dated Nov. 22, 2018 (6 pages).
GB1809543.0, Examination Report under Section 18(3) (Patents Act 1977), dated Sep. 24, 2020 (4 pages).
Battery University (BU), BU-402: What is C-Rate?, Last updated Mar. 9, 2017, (https://batteryuniversity.com/learn/article/what_is_the_c_rate) (15 pages).
Li et al., Fast Characterization Method for Modeling Battery Relaxation Voltage, Batteries 2016 (Apr. 2016), 2, 7; doi:10.3390/batteries2020007 (15 pages).

* cited by examiner

*Primary Examiner* — Ladan Mohaddes
(74) *Attorney, Agent, or Firm* — Brian J. Pangrle

(57) ABSTRACT

A method can include powering circuitry via a lithium ion battery; during the powering, determining a discharge rate of the lithium ion battery; and, based at least in part on the determined discharge rate, adjusting a cut-off voltage for the lithium ion battery.

16 Claims, 14 Drawing Sheets

LITHIUM-ION BATTERY CUT-OFF VOLTAGE ADJUSTMENT

TECHNICAL FIELD

Subject matter disclosed herein generally relates to technology for one or more electrochemical cells.

BACKGROUND

Electrochemical cells include, for example, lithium-ion cells. Such cells can be repeatedly charged and discharged. Various technologies and techniques described herein pertain to electrochemical cells such as, for example, one or more lithium-ion cells of a lithium-ion battery.

SUMMARY

A method can include powering circuitry via a lithium ion battery; during the powering, determining a discharge rate of the lithium ion battery; and, based at least in part on the determined discharge rate, adjusting a cut-off voltage for the lithium ion battery. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
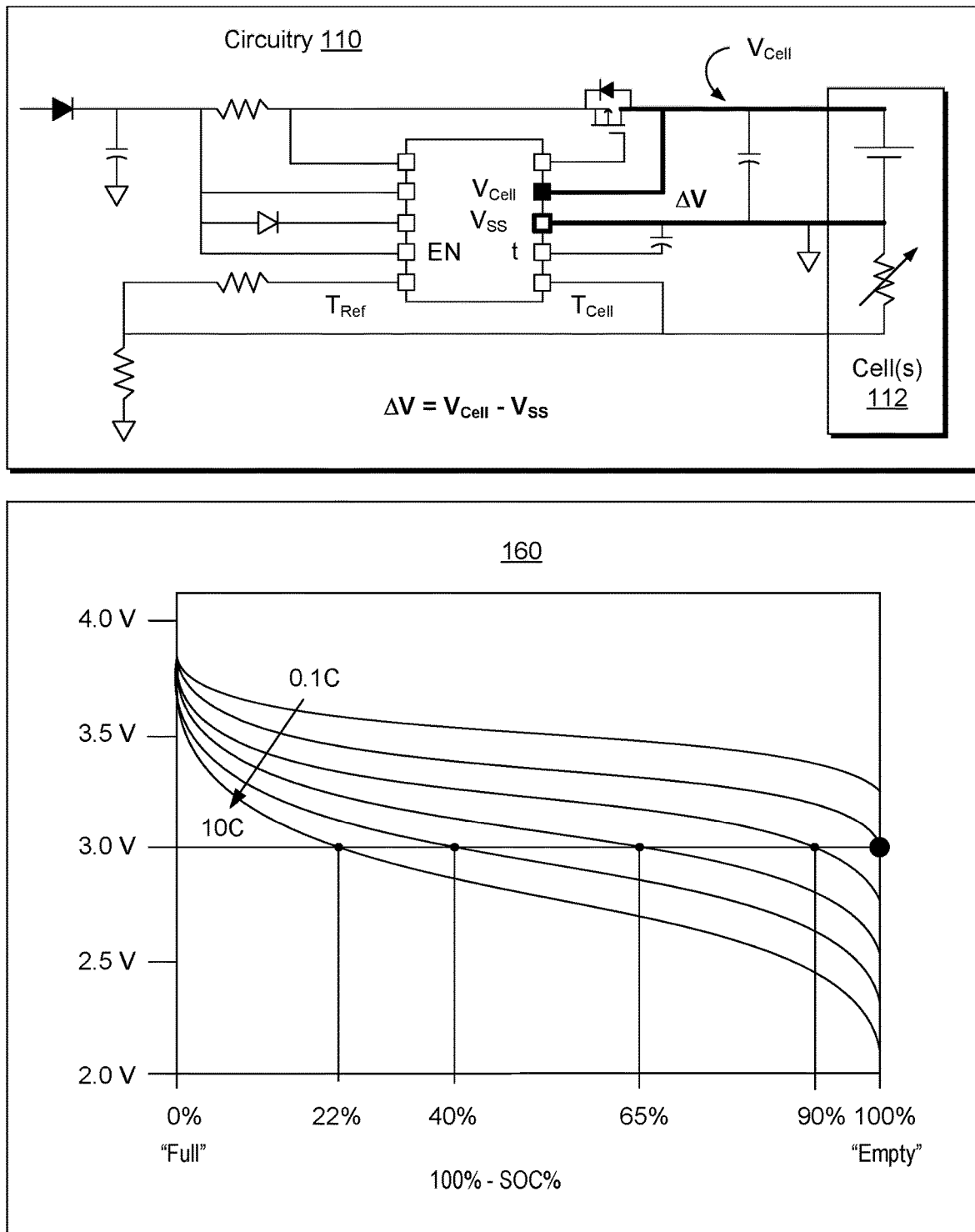
FIG. 1 is a diagram of an example of circuitry operatively coupled to one or more cells of a battery and an example of a plot of voltage versus state of charge (SOC) for various discharge rates of a battery.

FIG. 1 shows an example of circuitry 110 for managing one or more electrochemical cells 112 and an example of a plot 160 of voltage versus state of charge (SOC) with respect to various discharge rates, ranging from approximately 0.1 C to approximately 10 C. As to SOC, in the plot 160, it is shown in terms of utilization where 100 percent corresponds to utilization of 100 percent of a "full" charge; thus, 0 percent corresponds to a "full" charge and 100 percent corresponds to what may be considered to be "empty" or no charge. In the plot 160, the x-axis may be viewed with respect to time. For example, the x-axis can be a time axis where the voltage changes as indicated by the curves given a relatively constant discharge rate. As an example, the circuitry 110 and the cell(s) 112 can be a battery assembly; noting that a battery assembly can include, alternatively or additionally, one or more other types of circuitry.

A charge rate and/or a discharge rate may be referred to as a C-rate and be specified using a numeric value followed by the capital letter "C". A C-rate specifies the speed a battery is charged or discharged. Speed may be relatively constant for an application(s), function(s), etc., or, for example, speed may vary with respect to time as application (s), function(s), etc., change. As to C-rate, at 1 C, a battery charges and discharges at a current that is on par with a marked Ah rating (e.g., as specified by a manufacturer, etc.). At 0.5 C, the current is half and the time is doubled, and at 0.1 C the current is one-tenth and the time is 10-fold.

The capacity of a battery may be rated with respect to a C-rate, for example, a battery rated at 1 C means that a fully charged battery rated at 1 Ah can be expected to provide 1 A for one hour (h). The same battery discharging at 0.5 C can be expected to provide 500 mA for two hours (2 h), and at 2 C, 2 A for 30 minutes (0.5 h).

As to the term load, it defines the current that is drawn from a battery. Internal battery resistance and depleting state of charge (SOC) can cause voltage to drop under load, which can in some instances trigger an end of discharge (e.g., termination of discharge or discharging). Power relates to current delivery measured in watts (W); energy is the physical work over time measured in watt-hours (Wh).

As to the terms specific energy and gravimetric energy density, these define battery capacity in weight (Wh/kg); whereas, the term volumetric energy density defines battery capacity with respect to volume in liters (Wh/l). As an example, a lithium ion battery may be of a volumetric energy density that is in a range of about 10 Wh/l to more than 1,000 Wh/l. Where a device that includes circuitry with an expected load that is to be powered by a lithium ion battery and intended to be compact, such a device can benefit from a higher volumetric energy density battery as a higher volumetric energy density may allow for the device to be more compact (e.g., when compared to a battery with a lower volumetric energy density for the expected load).

As illustrated in the plot 160, consider the x-axis representing time, for a battery operated at a higher discharge rate (e.g., 10 C) with a fixed cut-off voltage (e.g., 3.0 V), circuitry that manages the battery will terminate discharging of the battery sooner, which can limit its usage capacity. For example, the 10 C discharge rate may cause the circuitry to terminate discharging when the voltage of the battery reaches the 3.0 V cut-off value such that the battery still has a remaining useful capacity of tens of percent (e.g., in the plot 160, about 78 percent). In contrast, at a lesser discharge rate, the voltage of the battery will reach the 3.0 V cut-off at a time when a greater percentage of the capacity of the battery has been used.

As an example, a method can include adjusting a cut-off voltage of a battery based at least in part on discharge rate. For example, such a method may help to address a situation where a high discharge rate would stop sooner and leave the rest of the battery's capacity unused. Such method can include decreasing the cut-off voltage to utilize that capacity. A method may include utilizing remaining capacity with a constant voltage load or with lowering the cut-off voltage temporarily.

A cut-off voltage is a voltage at which discharge of a battery may be terminated to reduce risk of damage to the battery. Circuitry operatively coupled to a battery may act to terminate discharge (e.g., discharging) of a battery once the voltage reaches the cut-off voltage. A cut-off voltage can be considered a lower-limit voltage at which battery discharge is considered complete.

Cut-off voltage can differ from one type of battery to another. For example, a NiMH or NiCd battery can have a cut-off voltage of 1.0 V per cell; whereas, 0.9 V can be used as the cut-off voltage of an alkaline cell. As an example, a single-cell lithium ion battery that powers a mobile phone may have a cut-off voltage of 3.3 V where the mobile phone discharges at a discharge rate that utilizes greater than about 92% of the capacity of the single-cell lithium ion battery (at room temperature).

As to risk of damage, a voltage cut-off below 3.2 V for some types of lithium ion batteries can lead to chemical instability, which can reduce battery lifetime. A cut-off voltage of 3.3 V for some types of lithium ion batteries can, for some devices, maintain battery stability such that replacement may not be necessary by a user (e.g., a consumer, etc.) during the useful lifetime of a device.

As an example, a method can include powering circuitry via a lithium ion battery; during the powering, determining a discharge rate of the lithium ion battery; and, based at least in part on the determined discharge rate, adjusting a cut-off voltage for the lithium ion battery. In such an example, a cut-off voltage may be initially set to a default value, which may be, for example, a voltage value in a range from about 3 V to about 3.5 V for a lithium ion battery where the circuitry can be circuitry of a device that may operate, at times, at a discharge rate that is less than approximately 2 C and, for example, greater than approximately 0.1 C. In such an example, the default value for the discharge rate may be selected in an aim to preserve longevity of the lithium ion battery (e.g., reduce risk of damage due to lower voltages) and in an aim to utilize a large percentage of the lithium ion battery's capacity (e.g., greater than approximately 90%). In the foregoing example, where a determination has been made that the discharge rate of the lithium ion battery has increased, for example, to a value greater than approximately 2 C, the adjusting may decrease the cut-off voltage such that a greater percentage of the capacity of the lithium ion battery may be utilized while being discharged (e.g., at the determined discharge rate). Such adjusting can include adjusting the cut-off voltage to an adjusted cut-off voltage value, which may be greater than a minimum cut-off voltage value.

As an example, a minimum cut-off voltage value may be greater than approximately 0.5 V (e.g., 0.75 V, 1 V, 1.25 V, 1.5 V, 1.75 V, 2 V, etc.). As an example, a minimum cut-off voltage value may be determined based at least in part on an expected period of time that a battery may discharge at a determined discharge rate. For example, where the expected period of time is short, a lower value may be utilized as the battery may be exposed to the lower value for a relatively short period of time. A minimum cut-off voltage value may be determined from data as to battery integrity (e.g., chemical, structural, capacity, etc.), which may include voltage versus time data.

As an example, circuitry can be powered by one or more batteries, which can include one or more lithium ion batteries. Such circuitry may be part of a device that includes a battery bay that can receive at least one of the one or more batteries.

As an example, a battery assembly can include circuitry that can manage one or more operational features of a battery and/or a device can include circuitry that can manage one or more operational features of a battery. Such circuitry may be referred to as management circuitry (e.g., battery management circuitry). As an example, management circuitry of a battery assembly and/or management circuitry of a device can manage battery discharge cut-off voltage optimization for high rate discharge applications that utilize circuitry.

As shown in FIG. 1, management circuitry 110 includes an integrated circuit with 10 pins. The pins may include charge current sense input, battery management input supply, charge status output, logic enable, cell temperature sensor bias, cell temperature sensor input, timer set, cell management 0 V reference, cell voltage sense, and drive output. As to protection features, a cell temperature sensor bias feature may provide for a voltage reference to bias an external thermistor for continuous cell temperature monitoring and prequalification while a cell temperature sensor input feature may provide for input for an external thermistor for continuous cell temperature monitoring and pre-qualification (optionally may be disabled by applying a set voltage) and safety timers (e.g., preconditioning, fast charge, elapsed time termination, etc.) that may be scaled by a capacitor. A temperature-sensing circuit may have its own reference such that it is immune to fluctuations in the supply voltage input (e.g., where the temperature-sensing circuit is removed from the system when no supply is applied, eliminating additional discharge of cell(s)).

As to logic, a logic enable feature may provide for input that, for example, forces charge termination, initiates charge, clears faults or disables automatic recharge. For example, a logic-enable input pin (EN) may provide for features to terminate a charge anytime during the charge cycle, initiate a charge cycle or initiate a recharge cycle. A logic input (e.g., high or low) may signal termination of a charge cycle.

As an example, a cell voltage sense function (e.g., implemented in part via the pin labeled "$V_{Cell}$") can provide for monitoring voltage at, for example, a positive terminal of a cell (e.g., for single, dual, etc., series cell packs with coke or graphite anodes) with respect to a reference that is based on the negative terminal of a cell (see, e.g., the pin labeled $V_{SS}$). Thus, the management circuitry 110 can measure voltage (e.g., $\Delta V$) as a difference between a cathode potential ($V_{cathode}$, as applied at the pin $V_{Cell}$) and an anode potential ($V_{anode}$, as applied at the pin $V_{SS}$). As an example, a specified voltage ($\Delta V_{REG}$) may be a limit for $\Delta V$.

As an example, circuitry, which may be referred to as monitoring circuitry or management circuitry, may provide information as to voltage of a battery or batteries. As an example, voltage may be in the form of $V_{Cell}$ such as in the example management circuitry 110 of FIG. 1.

As an example, the management circuitry 110 may operate stand-alone or in conjunction with one or more other circuits (e.g., a host controller, etc.). Management circuitry may apply constant current followed by constant voltage to charge one or more cells. As an example, charger circuitry may include a MCP7384X family chip (Microchip Technology, Inc., Chandler, Ariz.), which is described in a document entitled "Advanced Single or Dual Cell Lithium-Ion/Lithium-Polymer Charge Management Controllers" (Microchip Technology, Inc., 2004), which is incorporated by reference herein. As described herein, the term "lithium-ion" includes, for example, "lithium-polymer" as well as "lithium-ion polymer". Management circuitry may be provided with a battery, a package, a device, as part of dedicated power circuitry (e.g., a battery charger), etc.

Management circuitry may be configured to manage, to varying extent, state-of-charge (SOC) mismatch and capacity/energy; noting that as the number of cells and load currents increase, the potential for mismatch can also increase. Though SOC may be more common, each type of mismatch problem may limit capacity (mAh) of a pack of cells to capacity of the weakest cell. As an example, a method that can adjust cut-off voltage may do so at least in part based on information for one or more individual cells, which may help to reduce risk of damage to one or more of the cells. For example, where a cell is in a circuit with a plurality of cells and where a rate of discharge increases, if that cell is at risk of damage, a decision may be made to limit a reduction in cut-off voltage to help reduce risk of damage to that cell. Such a method may aim to protect the weakest link in terms of a cell being a "weakest" of a plurality of cells that may make up one or more batteries.

In the example of FIG. 1, the cell(s) 112 can be one or more lithium-ion cells, which can be in the form of one or more lithium-ion batteries. As an example, the cell(s) 112 may include a polymer composite material such as polyethylene oxide or polyacrylonitrile that includes lithium salt. Such a cell or cells may be referred to as a lithium-ion battery (or batteries) or a lithium-ion polymer battery (or batteries) or a lithium-polymer battery (or batteries) (e.g., "LiPo battery" or "LiPo cell"). LiPo cells are sometimes referred to as laminate cells, which may be configured very thin or quite large depending on their intended use. One or more LiPo cells may be encased in a flexible aluminum foil laminate pouch (e.g., with a thickness on the order of about 0.1 mm). LiPo cells may include a stacked construction formed by stacking electrode and electrolyte materials in a flat sandwich (e.g., defined by length, width and height dimensions). Stacked layers may be packed in a package (e.g., the pouch package 130) in a flat, rolled or other configuration. LiPo cell capacities can include capacities in a range, for example of about 50 mAh (e.g., for a small cell such as for a Bluetooth headset) to about 10 Ah or more for an electric vehicle (e.g., electric or hybrid). As an example, a battery assembly can include one or more LiPo cells and circuitry that can manage one or more aspects of such one or more LiPo cells. As an example, such circuitry may be powered by a separate cell or battery (e.g., a back-up type of battery).

As to function of a lithium-ion cell, lithium ions move from a negative electrode to a positive electrode during discharge and reversely when being charged. As an example, a LiPo cell can include a polyethylene (PE), a polypropylene (PP), a PP/PE, or other material as a separator. Some LiPo cells include a polymer gel containing an electrolyte solution, which is coated onto an electrode surface. For LiPo cells, close packing can allow for a high density.

For lithium-ion cells, when cell voltage drops to a low value (e.g., about 1.5 V), reactions at an anode can produce gas (e.g., over-discharge or "OD"). If voltage continues to drop (e.g., under about 1 V), copper of a copper-based anode current collector can start to dissolve and may short out a cell. When cell voltage increases to a high value (e.g., about 4.6 V), gassing may occur at a cathode as electrolyte may start to decompose (e.g., overcharge or "OC"). As an example, a method that can include adjusting a cut-off voltage may limit one or more cut-off voltage adjustments based at least in part on cell chemistry, for example, to help avoid risk of an OD condition or OD state. For example, given a particular cell chemistry (e.g., materials that make up a cell), a method may set a lower limit as to adjustments that decrease cut-off voltage. Such a lower limit may be a gas producing voltage plus a safety factor (e.g., consider a factor of about 5 percent to about 10 percent, etc.).

As an example, a lithium-ion cell or cells may be connected to an external thermal fuse for overcharge protection (e.g., in addition to the control by management circuitry). A normal range may lie between an overcharge region (OC) and an over-discharge region (OD); damage may occur in either of these regions.

As to some examples of battery materials and voltages, consider a $LiCoO_2$ cathode material with a maximum operational potential of about 4.2 V and a $LiMnO_4$ cathode material with a maximum operational potential of about 4.3 V. Such types of batteries may have associated OD voltages, which, as mentioned, may optionally be utilized for purposes of setting a lower limit for adjustments to cut-off voltage(s) where such adjustments may aim to decrease cut-off voltage(s).

In the example of FIG. 1, the management circuitry 110 can reference all inputs and outputs with respect to a management circuit reference potential ($V_{SS}$) that is intended to be a 0 V reference potential. In the circuitry 110, one of the pins, labeled $V_{SS}$, is electrically connected to the "negative" electrode of the cell(s) 112. Specifically, it is electrically connected with the anode(s) of the cell(s) 112. As an example, voltage at the pin labeled $V_{Cell}$ can be measured with respect to a negative electrode (i.e., anode(s)) of the cell(s) 112 (e.g., applied to the pin labeled $V_{SS}$). Such an approach relies on an assumption that the negative electrode (i.e., anode(s)) of the cell(s) 112 (e.g., $V_{SS}$) has a potential of approximately 0 V and remains at approximately 0 V. However, should changes occur to the cell(s) 112, the potential of the anode may not remain constant. As an example, circuitry may optionally adjust for such an occurrence. For example, where an internal reference electrode exists for the cell(s) 112, circuitry may be able to determine whether the assumption for the negative electrode is proper and, if not, account for a deviation as part of a method that may aim to adjust a cut-off voltage.

As an example, a device or a battery assembly can include circuitry that can determine discharge rate via one or more approaches. For example, discharge rate may be determined by sensing current as discharge current and/or discharge rate may be determined by sensing voltage as a drop in voltage in response to discharge current. As explained below with respect to plots 410 and 420 of FIG. 4, voltage can be of a particular shape with respect to time for a given discharge current. As an example, sensed voltage (e.g., measured voltage) may be processed to determine discharge current where such processing can take into account behavior of voltage in response to discharge current (e.g., drop behavior, forced regime behavior, etc.).

As mentioned, a method can include powering circuitry via a lithium ion battery; during the powering, determining a discharge rate of the lithium ion battery; and, based at least in part on the determined discharge rate, adjusting a cut-off voltage for the lithium ion battery. In such an example, the circuitry may be circuitry of a device and determining a discharge rate of the lithium ion battery may be performed using, for example, circuitry that includes one or more features of the management circuitry 110 of FIG. 1. As an example, a discharge rate may be determined based at least in part on voltage as measured by circuitry that includes one or more features of the management circuitry 110. A clock may be implemented using circuitry that can provide for determining a discharge rate. As an example, management circuitry may include a clock and voltage sensing circuitry that can be utilized to determine a discharge rate. In such an example, the voltage sensing circuitry may also be able to determine when a voltage has reached a cut-off voltage for purposes of terminating discharge of a battery (e.g., terminate discharging of a battery). As an example, the management circuitry 110 may include and/or be operatively coupled to current sensing circuitry (e.g., an ammeter, etc.).

Figure 2:
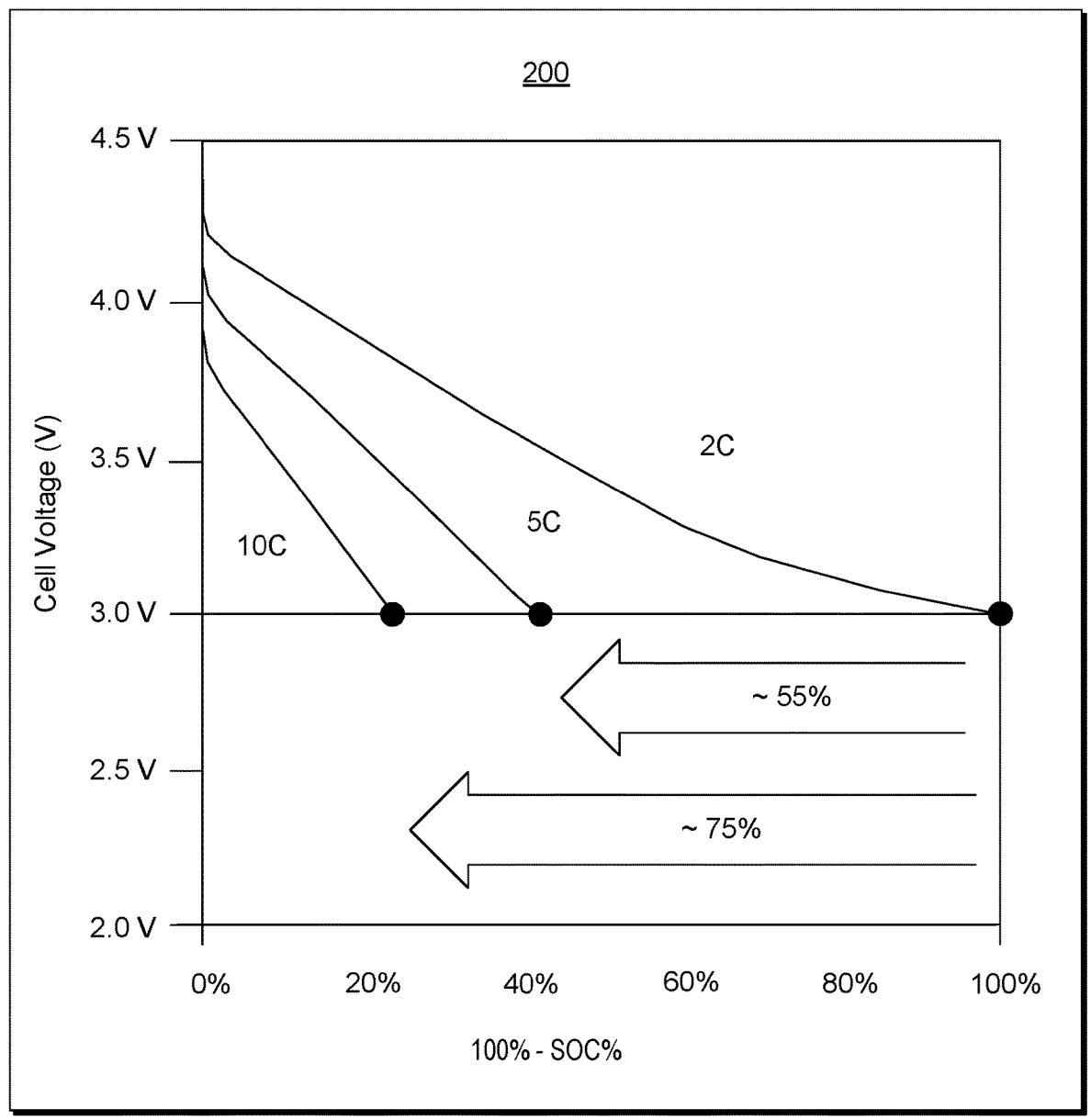
FIG. 2 is a diagram of an example of a plot of voltage versus state of charge (SOC)

FIG. 2 shows an example plot 200 of voltage versus utilized SOC for three discharge rates: 2 C, 5 C and 10 C and for a cut-off voltage of 3 V. As shown, the cut-off voltage of 3 V can be appropriate for the discharge rate of 2 C, such that approximately 100% of the SOC is utilized (e.g., about 0% remaining). However, for a discharge rate of 5 C, only about 45% of 100% of the SOC is utilized before the voltage reaches the cut-off voltage of 3 V (e.g., about 55% remaining) and, for a discharge rate of 10 C, only about 25% of 100% of the SOC is utilized before the voltage reaches the cut-off voltage of 3 V (e.g., about 75% remaining).

Figure 3:
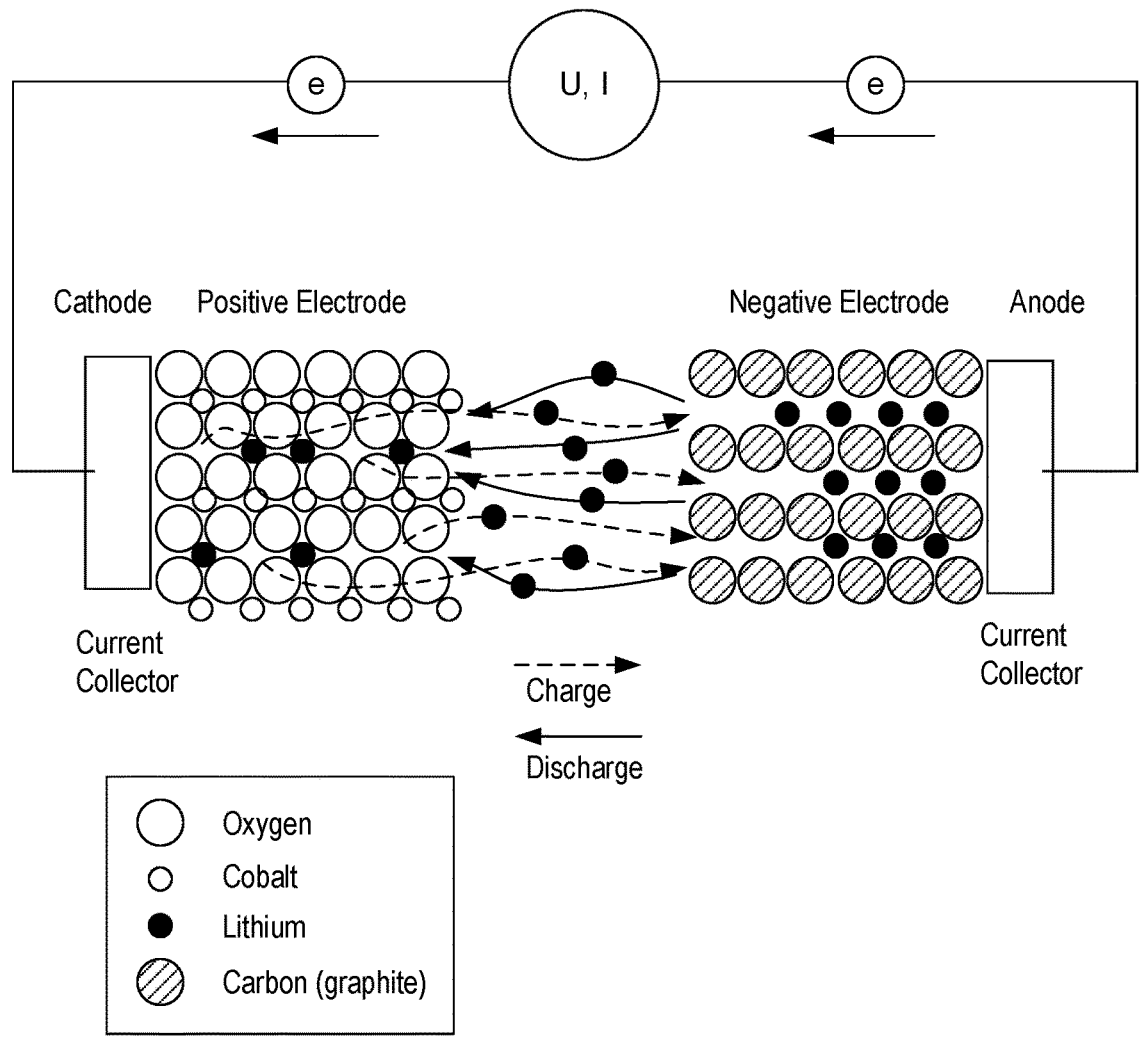
FIG. 3 is a diagram of an example of a lithium ion battery and a table of examples of cathode materials.

FIG. 3 shows a diagram of an example of a battery 310 and a table that includes some examples of parameters for cathode materials 320. In the example of FIG. 3, the battery 310 includes a cathode, an anode, a cathode current collector, an anode current collector, a positive electrode that includes oxygen and cobalt and a negative electrode that includes carbon (e.g., graphite, etc.). During charging, lithium ions can pass from the positive electrode to the negative electrode and, during discharging, lithium ions can pass from the negative electrode to the positive electrode. The table 320 shows some values for diffusion coefficients of lithium ions in various types of cathode materials that can function as positive electrodes (e.g., positive electrode materials or cathode materials) as well as some values for electrical conductivity of those various types of cathode materials.

In FIG. 3, the diffusion coefficient values are given in units of $cm^2s^{-1}$ while the electrical conductivity values are given in units of $Scm^{-1}$. Diffusion may be described, for example, using one or more of Fick's laws. As to Fick's second law, it can be utilized to predict how diffusion can cause concentration to change with respect to time. In one dimension, consider the following partial differential equation:

$$\frac{\partial \varphi}{\partial t} = D\frac{\partial^2 \varphi}{\partial x^2}$$

where $\varphi$ is the concentration in dimensions of amount of substance per unit volume, which is dependent on time, where x is a position (e.g., length) and where D is the diffusion coefficient in units of length squared with respect to time (in two or more dimensions, the Laplacian may be utilized, as appropriate to generalize the second derivative).

According to Fick's second law, concentration and diffusion coefficient can impact diffusion where, for a given concentration, a smaller diffusion coefficient means a lesser change in concentration with respect to time. As can be seen in the table 320 of FIG. 3, the diffusion coefficients tend to be low and characteristic of solid materials (e.g., chemicals diffusing into or out of a solid matrix). For comparison, consider a volatile chemical diffusing in air where a diffusion coefficient may be of the order of about $0.1\ cm^2s^{-1}$.

Diffusion can play a role in the behavior plotted in the plot 160 of FIG. 1 and in the plot 200 of FIG. 2. As such, behavior of a lithium ion battery with respect to discharge rate (e.g., diffusion of lithium ions into a cathode material), can depend on the chemical and/or physical structure of the cathode material of the lithium ion battery. As an example, circuitry that can manage a battery may be programmable or otherwise settable to operate based at least in part on type of cathode material of the battery, for example, to account for diffusion through use of a diffusion coefficient (or diffusion coefficients).

Diffusion can be temperature dependent. As such, the temperature of a battery can play a role in behavior where, for example, diffusion of lithium ions into a cathode material can increase with increasing temperature. As an example, circuitry that can manage a battery may be programmable or otherwise settable to operate based at least in part on temperature (e.g., cathode material temperature, etc.). In such an example, values may be stored in memory of a device and/or a battery assembly where such values correspond to a plurality of temperatures over a suitable range of operational temperatures. As an example, an equation and/or a model may be utilized to determine diffusion behavior based at least in part on measured temperature. As an example, a device and/or a battery assembly can include temperature measuring circuitry (e.g., a thermocouple, etc.).

As mentioned, the circuitry 110 of FIG. 1 can include circuitry that can measure temperature such as temperature of a cell of a battery. In such an example, one or more measured temperatures may be utilized in a method that can include adjusting a cut-off voltage. For example, where diffusion is greater due to an elevated temperature, it may be expected that a battery responds to a discharge rate in a quicker manner such that less capacity of the battery is left once a cut-off voltage is reached. Consider the curves of the plot 200 of FIG. 2 for 10 C and 5 C being shifted to the right. In such an example, a method that includes adjusting a cut-off voltage can adjust to a cut-off voltage that accounts for a change in diffusion due to temperature. For example, if an adjustment is to be a reduction from a present cut-off voltage by 0.25 V at room temperature, the reduction may be multiplied by a fraction (a value less than 1) for a measured temperature that is greater than room temperature (e.g., consider room temperature being an ambient temperature of approximately 20 degrees C.). In such an example, as temperature increases, the fraction may decrease to effectuate a lesser reduction in cut-off voltage.

Figure 4:
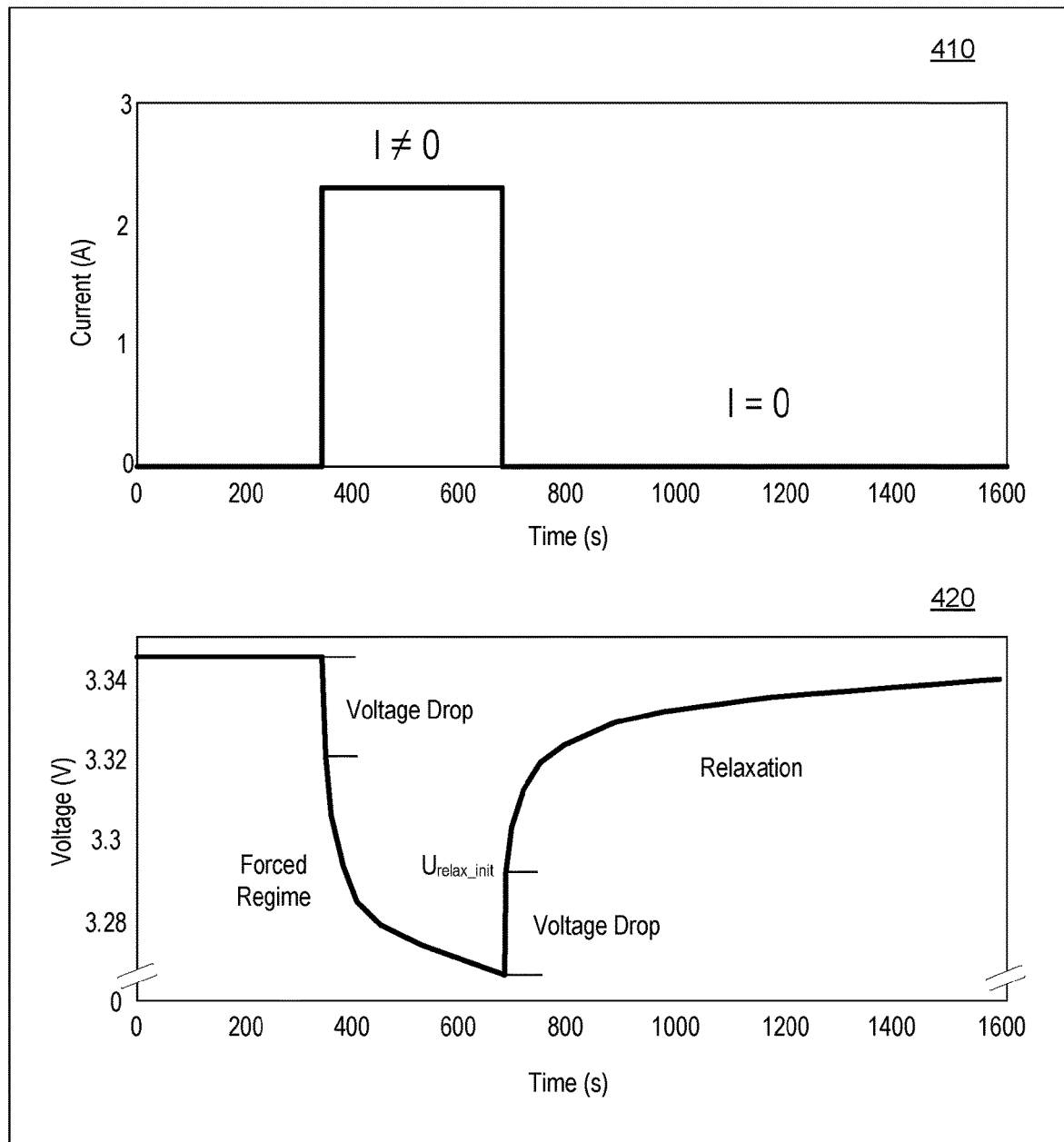
FIG. 4 is a diagram of a series of example plots of current and voltage versus time.

FIG. 4 shows example plots 410 and 420. The plot 410 shows current versus time in seconds and the plot 420 shows corresponding voltage versus time in seconds. The plot 410 shows current discharge of a battery raising to a level above 2 A at approximately 350 seconds, which causes a drop in voltage of the battery of about 0.03 V, which occurs over a period of time less than about 50 seconds. With the current maintained at the level above 2 A, the voltage enters a forced regime where the voltage decreases with respect to time with a gradually lessening rate in decrease until the current discharge drops to a current of approximately 0 A at about 680 s.

As shown in the plot 420, at about 680 s, the voltage of the battery rises when the current discharge drops to approximately 0 A, which may occur over a period of time of less than about 50 s. Next, the plot 420 shows the battery entering a relaxation phase, which spans from about 680 s to about 1600 s. For the relaxation phase, a voltage $U_{relax\_init}$, may be a voltage at the beginning of the relaxation phase.

In FIG. 4, the plots 410 and 420 illustrate how voltage of a battery can change in response to discharge as represented by the discharge current, which may, for example, be relatively constant over a period of time. Where discharge current varies with respect to time, voltage may vary as well in a corresponding manner as may be understood given the plots 410 and 420.

Figure 5:
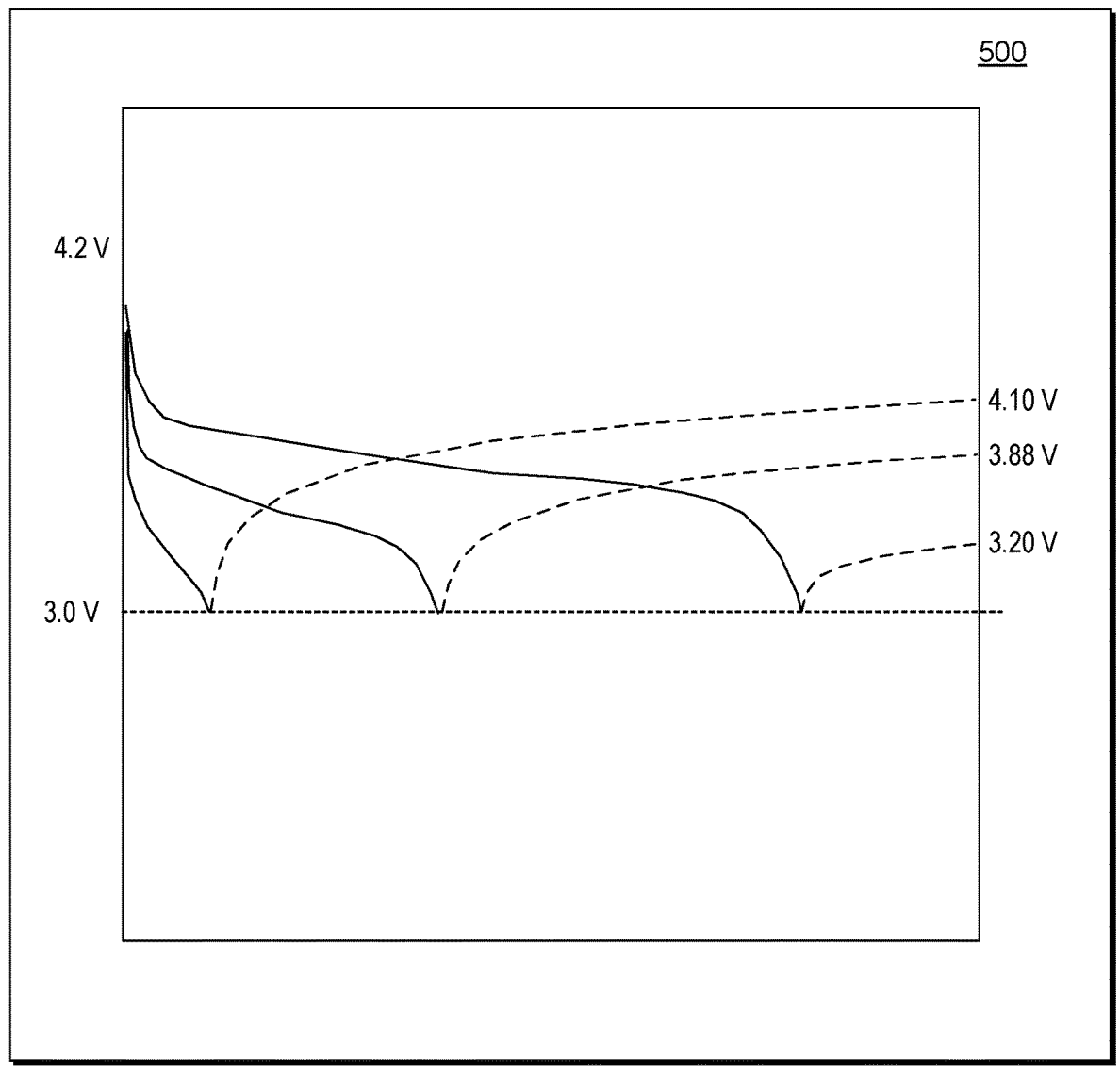
FIG. 5 is a diagram of an example plot of voltage versus time.

FIG. 5 shows an example plot 500 of voltage versus time for discharge phases (solid lines) and relaxation phases (dashed lines). As shown in the plot 500, when discharging a battery at different C rates, a higher C rate will produce a lower capacity and vice versa. Where a battery starts at about 4.2 V, commencement of discharge (see, e.g., the plots 410 and 420 of FIG. 4) results in a drop in the voltage followed by a forced regime. During the forced regime, the voltage decreases until reaching the cut-off voltage, which, in the example of the plot 500 of FIG. 5, is set at approximately 3.0 V. Once discharge is terminated due to the voltage reaching the cut-off voltage, the battery enters the relaxation phase (e.g., after a rise, etc.). As shown in the plot 500 of FIG. 5, the voltage rises to about 4.1 V for 1.5 C, to about 3.88 V for 1.0 C and to about 3.20 V for about 0.5 C. Such behavior can be diffusion-based and, as such, may depend on temperature. Where temperature measurement(s) are available via circuitry of a device and/or a battery assembly, temperature dependence of such behavior may be taken into account (e.g., as to time to reach a voltage, time to relax, etc.).

As shown in the plot 500 of FIG. 5, at a high discharge rate, with a fixed cut-off voltage, discharge stops sooner; however, the rest of the capacity of the battery is still there, as evidenced by the voltage rising during a relaxation phase. As an example, a method can include adjusting a cut-off voltage to get out at least a portion of that capacity. For example, given the data of the plot 500 of FIG. 5, a method can include reducing the cut-off voltage where such an adjustment can depend on discharge rate. In such an example, a higher discharge rate can correspond to a larger reduction in cut-off voltage. As an example, a method can include learning with respect to relaxation. For example, if a relaxation phase occurs after a voltage reaches a cut-off voltage for a battery that calls for terminating supply of power from the battery, a method can include measuring the rise in voltage, if any, and estimating an amount of capacity that may have been remaining at the time of the termination. Where the capacity is substantial and the cut-off voltage above a value that may be detrimental (e.g., due to gassing as may be associated with an OD condition), the method may learn that it can actually reduce the cut-off voltage further, for example, in a subsequent episode for a substantially similar discharge rate.

Figure 6:
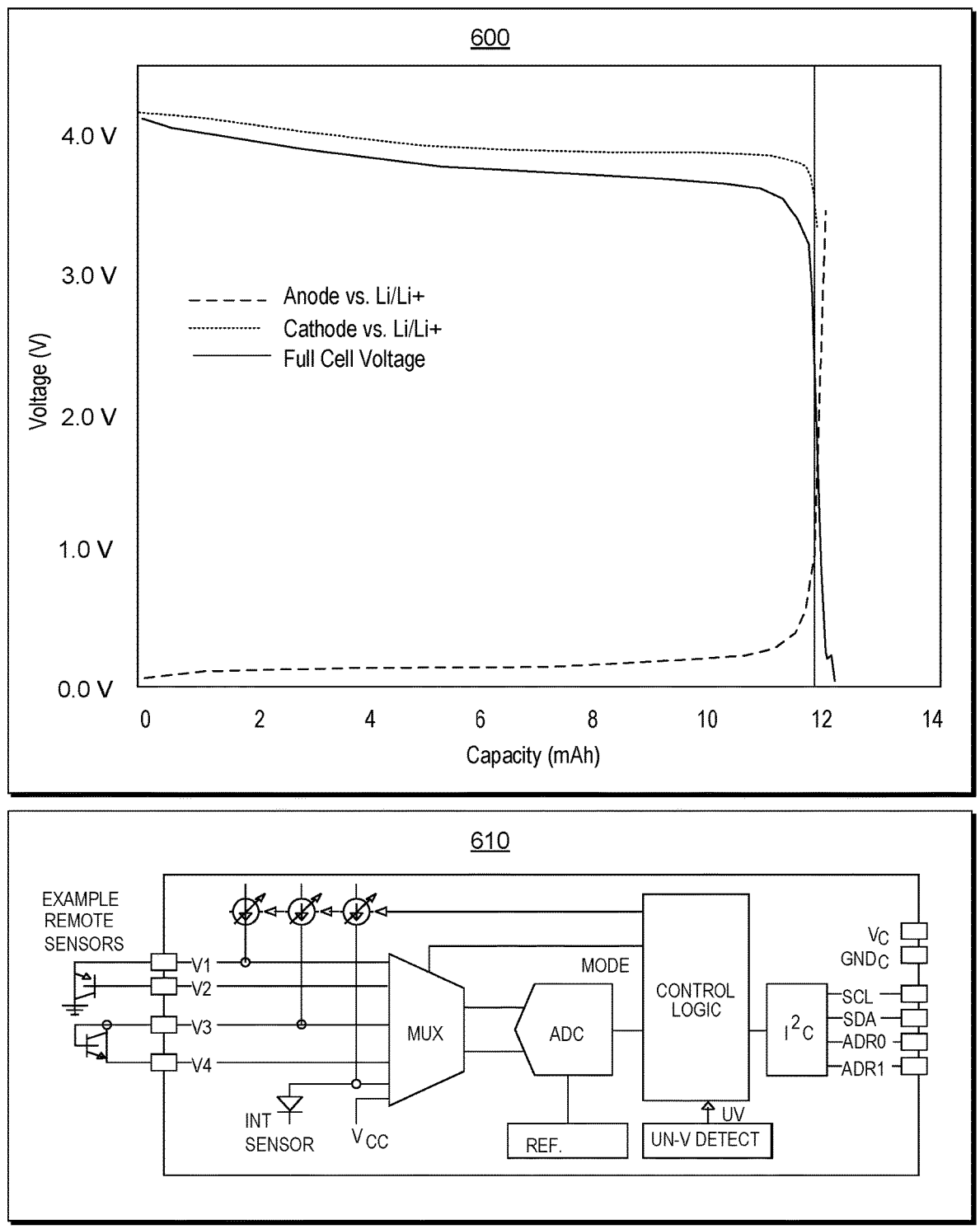
FIG. 6 is a diagram of an example plot of voltage versus capacity and a diagram of an example of circuitry.

FIG. 6 shows an example plot 600 of voltage versus capacity for a discharge rate (e.g., about 0.1 C) and an example of monitoring circuitry 610. The plot 600 provides information as to cut-off voltage limits. A method can include acquiring information as to an anode voltage, as to cathode voltage and/or as to the difference between a cathode and an anode. As an example, where a reference electrode is provided (e.g., integral to a battery, etc.), a method may include acquiring anode and/or cathode information with respect to the reference electrode. As an example, one or more types of voltage information may be acquired and utilized in a method that can adjust a cut-off voltage.

As an example, a method can include monitoring pressure of a battery. As mentioned, gas may be produced during operation of a battery, which may cause an increase in pressure and/or deformation to a container of a battery (e.g., a pouch, a case, etc.). As an example, a battery container may be fit with one or more strain gauges (e.g., piezoelectric circuits, etc.) that can measure change in shape, which may be associated with an increase in internal pressure within the battery container. In such an example, a method may account for such behavior by limiting a cut-off voltage such that risk of gas production may be reduced.

As mentioned, a method that can adjust a cut-off voltage may include acquiring information as to current and/or information as to voltage. As to current, a device and/or a battery assembly can include an ammeter as circuitry. For example, an ammeter can be utilized to measure current in a circuit. In such an example, the ammeter can be in series (in-line) with a circuit that includes a battery and circuitry powered by the battery such that electrons flowing in the circuit can be measured by the ammeter. In such an example, the ammeter may be considered to be part of the circuit.

As an example, a battery assembly that includes a battery and monitoring circuitry can be a smart battery. Such a battery assembly may include circuitry that can monitor one or more of impedance, resistance, current and voltage of one or more batteries of the battery assembly and/or one or more other batteries that may be operatively coupled to the battery assembly. One or more of a SMBus and a PMBus may optionally be utilized for purposes of gathering information and/or control (e.g., adjusting one or more battery related parameters such as cut-off voltage).

As an example, state-of-health (SOH) information may be acquired and optionally utilized in a method that can adjust a cut-off voltage. Capacity of a battery can be a maximum charge that the battery is capable of holding, which, when new may be expected to correspond to a specified capacity (e.g., manufacturer specified capacity). SOC is a measure of how much charge the battery is currently holding as compared to the capacity. SOH can be a metric that can be used to assess how closely a battery meets its design specifications. An assessment as to SOH can involve more than comparing a battery's current capacity with its specified capacity. For example, an undesirably high internal resistance can be an indicator of a less than optimal SOH. As an example, an SOH assessment may be made via measurement of internal resistance of a battery. As an example, a SOH assessment may take one or more other factors into account such as, for example, one or more of temperature and/or pressure, which may be maxima, frequency-based, time-profile(s) (e.g., temperature-time profile, pressure-time profile), etc.

In the example of FIG. 6, the monitoring circuitry 610 includes various components such as a multiplexer (MUX), an analog to digital converter (ADC), control logic, an undervoltage detector and a communication component (e.g., I$^2$C bus coupled component) along with interfaces for inputs and outputs. As an example, an undervoltage measured by the undervoltage detector may be associated with an OD condition (e.g., an OD state).

As an example, the monitoring circuitry 610 can include one or more features of the LTC 2990 circuitry (Linear Technology Corporation, Milpitas, Calif.). A LTC 2990 datasheet entitled Quad I$^2$C Voltage, Current and Temperature Monitor (2990fe, LT 1116 REV E, Linear Technology Corporation, 2010) is incorporated by reference herein.

The aforementioned LTC 2990 circuitry can be used to monitor temperatures, voltages and currents. The LTC 2990 circuitry may be configured via its serial interface. The LTC 2990 circuitry can provide sub-millivolt voltage resolution, 1% current measurement and 1 degree C. temperature accuracy (e.g., or any combination of the three). The LTC 2990 circuitry can be utilized to measure voltage and/or current of a battery. The LTC 2990 circuitry may further be utilized to measure temperature via a temperature sensor, which may be in thermal contact with a battery (e.g., directly and/or indirectly). As mentioned, phenomena such as diffusion can dependent on temperature. As an example, circuitry that can measure information as to discharge rate and temperature may be utilized to in a system that can adjust cut-off voltage of one or more batteries where such an approach may include accounting for diffusion based at least in part on temperature. As mentioned, where current information is desired, current monitoring circuitry may be in series with a circuit (e.g., or circuits). As mentioned, pressure may be measured. As an example, where a battery has a sealed volume, pressure and temperature may be utilized to estimate volume and/or whether gassing may be occurring and/or have occurred (e.g., as may be associated with an OD state or states).

As an example, depending on voltage range, current range, etc., one or more types of circuitry may be utilized. As an example, the LTC 4151 circuitry (Linear Technology Corporation, Milpitas, Calif.) may be utilized for voltages from about 7 V to about 80 V; noting that a system may include circuitry that can step-up and/or step-down voltage. For example, a voltage below 7 V may be increased to be in a range suitable for measurement by the LTC 4151 circuitry and/or a voltage greater than 80 V may be decreased to be in a range suitable for measurement by the LTC 4151 circuitry.

As an example, the circuitry 610 may be operatively coupled to a battery or batteries. As an example, a battery assembly may include circuitry that includes one or more features of the circuitry 610. As an example, a battery assembly can include monitoring circuitry and a serial interface that may, for example, operatively coupled to a serial interface of a device that includes circuitry that can be powered by a battery of the battery assembly. In such an example, information may be transferred via the serial interface, for example, to control operation of the monitoring circuitry, the battery and/or to control operation of circuitry of the device.

Figure 7:
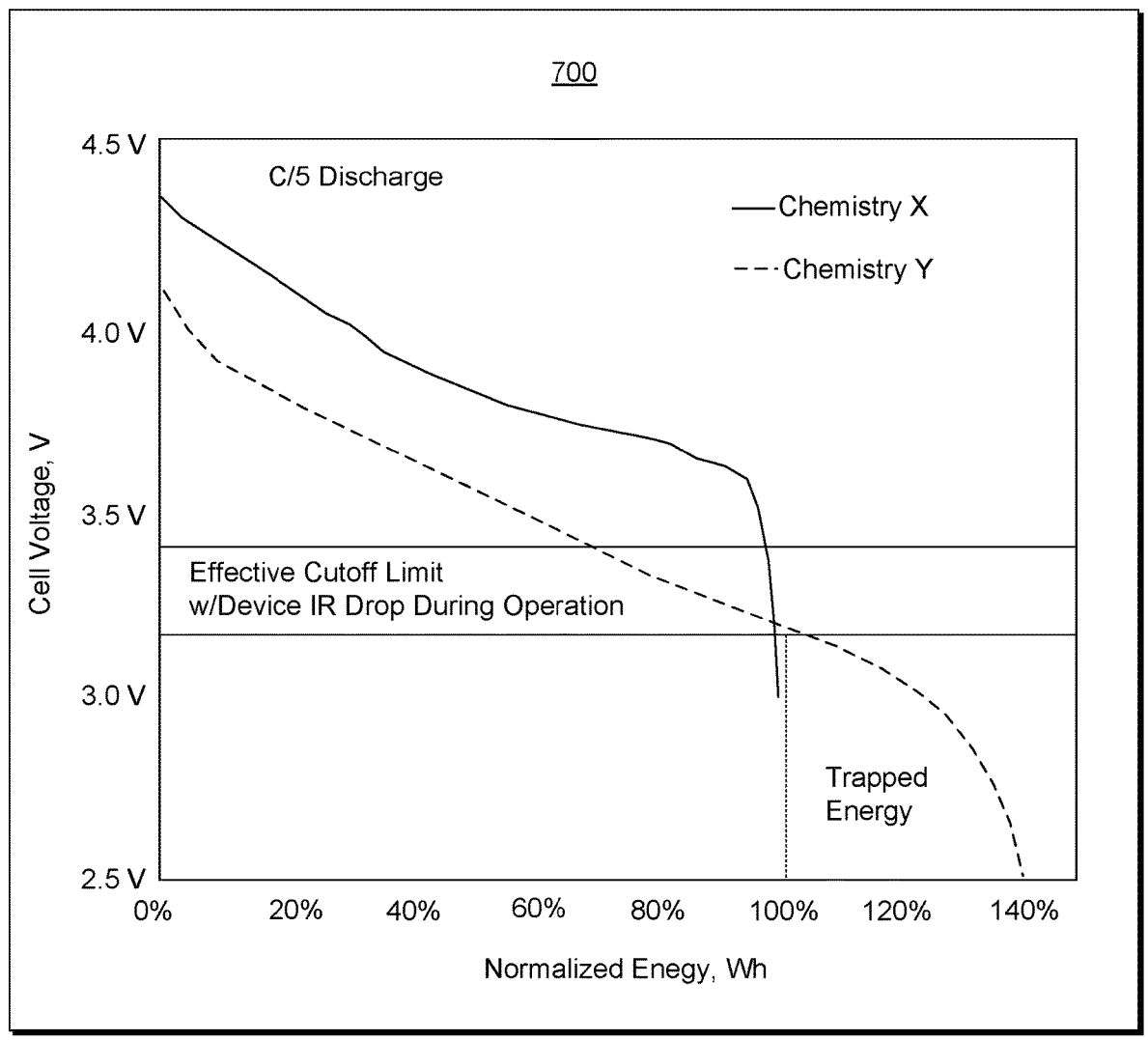
FIG. 7 is a diagram of an example plot of voltage versus normalized energy.

FIG. 7 shows an example plot 700 of voltage versus normalized energy. The plot 700 shows data for two different battery chemistries. As an example, a cut-off voltage that is less than 3.0 V may be utilized via an adjustment method in a manner that does not substantially degrade a battery. As an example, a method can include monitoring SOH of a battery, which may allow for determining whether one or more adjustments to a cut-off voltage may compromise or otherwise impact SOH. As an example, circuitry that includes one or more features of the circuitry 610 of FIG. 6 may be utilized to assess SOH of a battery. As an example, monitoring circuitry may provide information to a device that includes a processor where the device can utilize the processor to assess SOH based at least in part on at least a portion of the provided information. In such an example, the SOH may be associated with operation of one or more circuits of the device and/or one or more applications that can execute utilizing the processor. As an example, an assessed SOH may be associated with operation of a circuit and/or an application (e.g., consider a media player application that may be rendering streaming media to a display, etc.). In such an example, a method may adjust a cut-off voltage based at least in part on such an association or associations (e.g., consider setting a lower limit for a cut-off voltage due to a greater risk of a negative impact to SOH of a battery or batteries).

Figure 8:
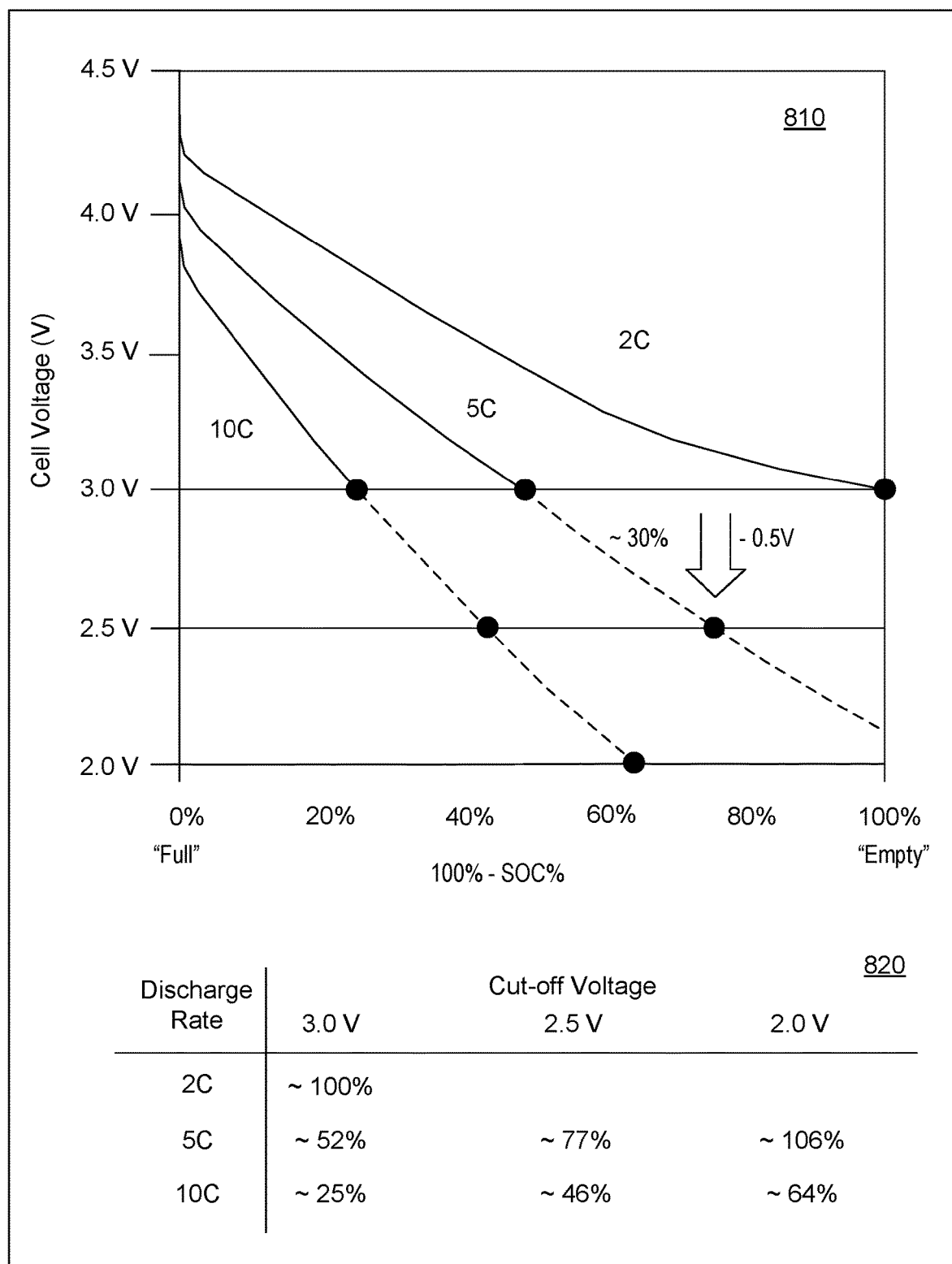
FIG. 8 is a diagram of an example plot of voltage versus state of charge (SOC) and a table of examples of values of the plot.

FIG. 8 shows an example plot 810 and an example table 820. In FIG. 8, the plot 810 shows voltage versus utilized SOC and the table 820 shows discharge rate with respect to cut-off voltage and corresponding approximate utilized SOC values in percent. As shown in the table 820, where a discharge rate is approximately 5 C, a cut-off voltage may be adjusted downwardly to a decreased value of approximately 2.5 V (e.g., a reduction of about 0.5 V from a value of about 3.0 V) or more (e.g., consider a reduction to approximately 2.0 V); and, where a discharge rate is approximately 10 C, a cut-off voltage may be adjusted downwardly to a decreased value of approximately 2.5 V (e.g., a reduction of about 0.5 V from a value of about 3.0 V) or more (e.g., consider a reduction to approximately 2.0 V). In the examples of FIG. 8, a reduction in cut-off voltage to a value less than 3 V, for discharge rates greater than approximately 2 C, can allow for a more full utilization of battery capacity. As shown in FIG. 8, for a discharge rate of approximately 5 C, an adjustment that decreases the cut-off voltage by approximately 0.5 V (e.g., from about 3.0 V to about 2.5 V) can result in an increased utilization of about 30 percent in terms of SOC utilization (e.g., from about 50 percent to about 80 percent where the percentages correspond to utilization of full charge or theoretically more than full charge).

Figure 9:
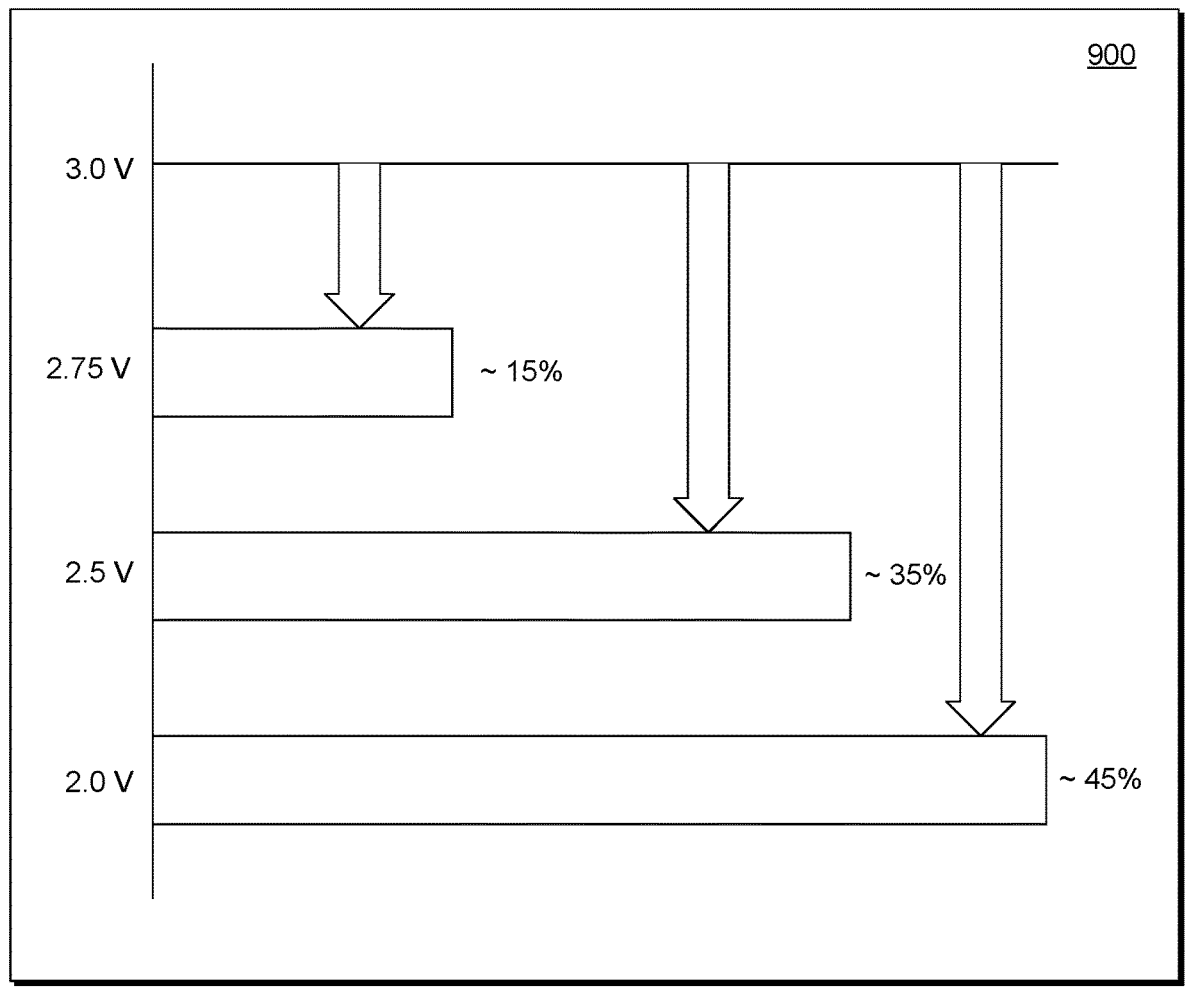
FIG. 9 is a diagram of an example plot.

FIG. 9 shows an example plot 900 of voltage versus utilized SOC. As shown, utilized SOC for a task can be increased by adjusting cut-off voltage from a higher value to a lower value (e.g., from 3 V to 2.75 V, from 2.75 V to 2.5 V, to 2.5 V to 2 V). As an example, an automated method may depend at least in part on SOC and adjust cut-off voltage to finish a task being performed by circuitry (e.g., consider one or more of execution of an application, rendering information to a display, rendering information to a speaker, transmitting information via an interface, receiving information via an interface, etc.). As an example, a method may be implemented in part via instructions stored in memory accessible by a processor where the instructions include executable instructions executable by a processor (e.g., processor-executable instructions), which may be a CPU, a microcontroller (e.g., such as a reduced instruction set computing (RISC) microcontroller), etc. In such an example, the instructions may optionally be firmware instructions. As an example, a battery assembly may include memory, accessible by a processor, that stores processor-executable instructions, which may be, for example, firmware instructions (e.g., stored in the memory during manufacture of the battery assembly and optionally updatable).

As an example, a method may determine discharge rate and then select a cut-off voltage based on the determined discharge rate where the selected cut-off voltage may be stored in a data structure in memory (e.g., a memory component, etc.). In such an example, a look-up table approach may be implemented that uses a determined discharge rate to look-up a corresponding cut-off voltage. In such an example, a discharge rate of 2 C may correspond to a cut-off voltage of 3 V; a discharge rate of 3 C may correspond to a cut-off voltage of 2.75 V; a discharge rate of 5 C may correspond to a cut-off voltage of 2.5 V; and a discharge rate of 10 C may correspond to a cut-off voltage of 2 V. Such an approach may include interpolation and/or finer resolution of discharge rates with respect to cut-off voltages.

As an example, reductions in cut-off voltage may be performed iteratively where, for example, if a particular discharge rate is maintained, successive reductions may be made. For example, where a 5 C discharge rate is determined for a period of about 15 seconds, a first reduction in cut-off voltage may be made. In such an example, where that discharge rate persists for another 15 seconds, a second reduction in cut-off voltage may be made (e.g., as long as the voltage is above a voltage that may be a lower limit that aims to reduce risk of an OD condition).

As an example, a device and/or battery assembly may include one or more options as to implementation of a cut-off voltage adjustment method. As an example, one option may be to set the cut-off voltage to a particular value that is less than a default cut-off voltage value if the discharge rate is greater than approximately X C, where X can be a value that is greater than 2 C (e.g., consider 2.5 C, 3 C, 3.5 C, etc.).

As an example, a device and/or a battery assembly can include circuitry that determines discharge rates and that implements a method that can adjust a cut-off voltage if one or more of the determines discharge rates exceeds a particular discharge rate. For example, a user may utilize a smartphone in a manner where its discharge rate does not exceed 2 C. In such an example, the smartphone can include circuitry that decides not to implement the method; whereas, if one or more of the determined discharge rates exceeds 2 C (e.g., optionally plus an additional factor), the smartphone may automatically implement the method or, for example, render a graphical user interface to a display of the smartphone that allows a user to indicate whether to implement the method or not (e.g., consider a GUI with a graphical control as a button, etc., to implement or not implement).

As an example, a method can include accessing one or more operating system associated functions. For example, various WINDOW® operating systems include a powercfg command that can generate a battery report (e.g., powercfg/batteryreport/output "C:\battery_report.html" to generate the HTML file at the particular storage location). As an example, a method can include generating one or more reports and extracting information from such one or more reports. In such an example, the information may be utilized to determine whether or not an adjustment to a cut-off voltage can be made to more effectively utilize capacity of one or more batteries. Such a report can include design capacity of a battery and full charge capacity of a battery. Such a report can include usage information such as, for example, "Recent Usage", as to time, state (active, suspended), power source and remaining capacity of the battery. Such information can show when a device went to sleep, became active, and or was charged with AC power along with the mWh capacity. As to SOH, information as to life estimates may be extracted from such a battery report.

As explained, when a battery is discharged at a fast rate, circuitry operatively coupled to the battery, such as battery management circuitry, may indicate that the battery is "drained" once the voltage reaches a preset minimum discharge voltage (e.g., 3.0 V). However, when discharged at that fast rate, due to various phenomena, there can still be substantial energy remaining in the battery even though it is indicated to be at the preset minimum discharge voltage (e.g., cut-off voltage).

As explained, a method can provide for accessing such remaining energy without posing a substantial risk of damaging the battery. Such a method may be deemed an "overclocking" method that overclocks a battery by draining it below the preset cut-off voltage when a high rate discharge is detected. Such a method can adjust the cut-off voltage in a variable manner that is based at least in part on a rate of discharge. With respect to the plot 160 of FIG. 1, such an approach can, in effect, shift a discharge curve from a lower curve to a higher curve (e.g., in a direction of the arrow from 10 C towards 0.1 C.

As an example, a method can include sensing a discharge rate of a battery; determining that the discharge rate is a high discharge rate; and, in response to determining that the discharge rate a high discharge rate, adjusting a cut-off voltage for the battery. In such an example, the determining may compare the discharge rate to a set discharge rate value to make a determination that the discharge rate is a high discharge rate. For example, for a device that includes circuitry that may operate at a discharge rate of less than about 2 C to perform various functions and that may operate at a discharge rate of greater than about 2 C to perform various functions, a discharge rate greater than about 2 C may be determined to be a high discharge rate.

As to functions that may give rise to a high discharge rate, consider, for example, rendering video to a display, which may be a LCD, LED, OLED, etc. type of display. Such rendering may be associated with gaming, watching a movie, watching TV, performing animation operations (e.g., CAD, cartoon, etc.), etc.

As an example, a display may include a Low Temperature Poly Silicon (LTPS) backplane. As an example, OLED displays, when compared to LCD display, can be more power efficient for mixed image content because they are emissive displays so their power varies with the Average Picture Level (average brightness) of the image content; whereas, for LCD displays, the display power tends to be independent of image content. For mixed image content (that includes photos, videos, and movies, for example) with a 50 percent Average Picture Level (APL), one type of smartphone with an OLED display may be about 20 percent more power efficient than another type of smartphone with an LCD display; whereas, on the other hand, for a Full White Screen with 100 percent APL, that LCD display smartphone may be about 45 percent more display power efficient than the OLED smartphone.

As an example, a device can be a mobile device that has an operating system stored in memory that is executable using a processor of the mobile device as powered by a battery, which can be a lithium ion battery. Such a device can include a network interface and a display, both of which can be powered by the lithium ion battery. Such a device can include one or more applications that are executable in an operating system environment established via execution of the operating system. As an example, an application may be an "app". An app may perform operations that include requesting and receiving information via one or more network interfaces (e.g., WiFi, 3G, 4G, etc.). As an example, consider the NETFLIX app for iOS or ANDROID or other operating system.

The NETFLIX app can access video content via a network interface where such video content may include TV shows and movies. The NETFLIX app allows a user to operate a mobile device via interactions with the app to browse titles, search, etc. Selected video content can be streamed to the mobile device and rendered to a display of the mobile device, as circuitry of the mobile device is powered by a lithium ion battery of the mobile device. Use of such a video streaming app can cause a mobile device to increase the discharge rate of a lithium ion battery of the mobile device. In such an example, without implementation of a method that can adjust a cut-off voltage, a user may experience a shutdown of the mobile device before being able to watch an episode of a TV show (e.g., consider an episode of approximately 30 minutes or about 1800 seconds). Where a method is implemented that can adjust a cut-off voltage, the method may determine that the mobile device is operating at an elevated discharge rate and, in response, adjust a cut-off voltage downward to thereby allow the user to watch the entire episode of the TV show with a reduced risk of a shutdown of the mobile device occurring.

While the foregoing example refers to a particular app for video content as to TV shows or movies, as another example, consider a game app or gaming app. Such an app may utilize various circuitry of a mobile device, including rendering circuitry that renders video to a display of the mobile device and rendering circuitry that renders audio to a speaker of the mobile device, a headset, a wireless speaker, etc. Where a method is implemented that can adjust a cut-off voltage, the method may determine that the mobile device is operating at an elevated discharge rate and, in response, adjust a cut-off voltage downward to thereby allow the user to continue gaming (e.g., playing a game) with a reduced risk of a shutdown of the mobile device occurring.

As an example, execution of location services by an app or apps may cause a device to operate at an elevated discharge rate. Such location services can operate one or more network interfaces for gathering information to determine location of the device. Where a method is implemented that can adjust a cut-off voltage, the method may determine that a device is operating at an elevated discharge rate and, in response, adjust a cut-off voltage downward to thereby allow the device to continue using location service(s) with a reduced risk of a shutdown of the mobile device occurring.

Figure 10:
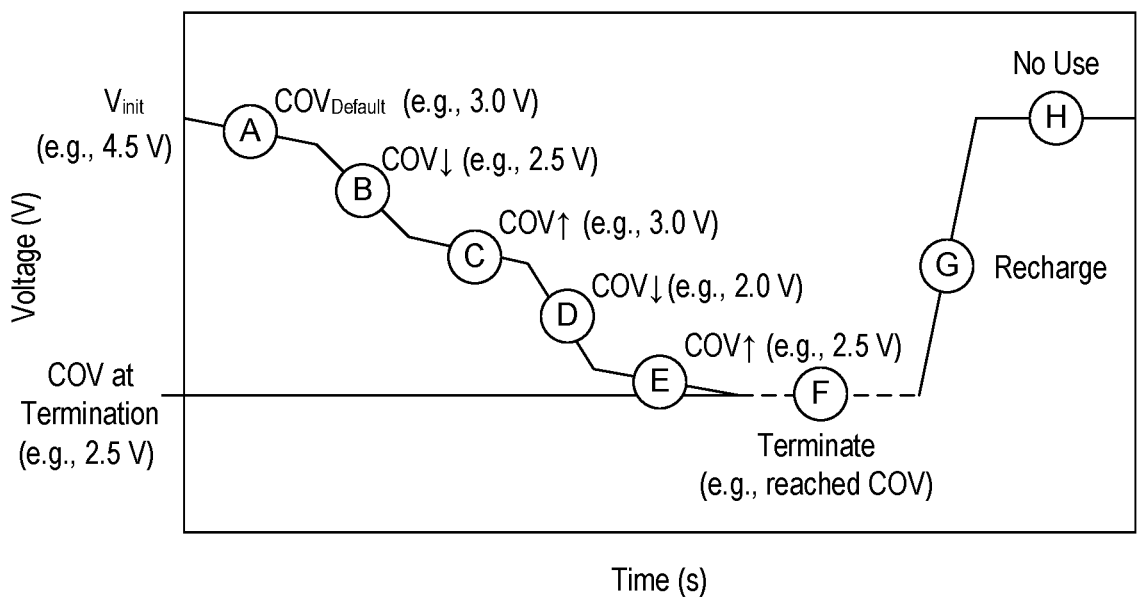
FIG. 10 is a diagram of an example plot and an example of a method.
Figure 10:
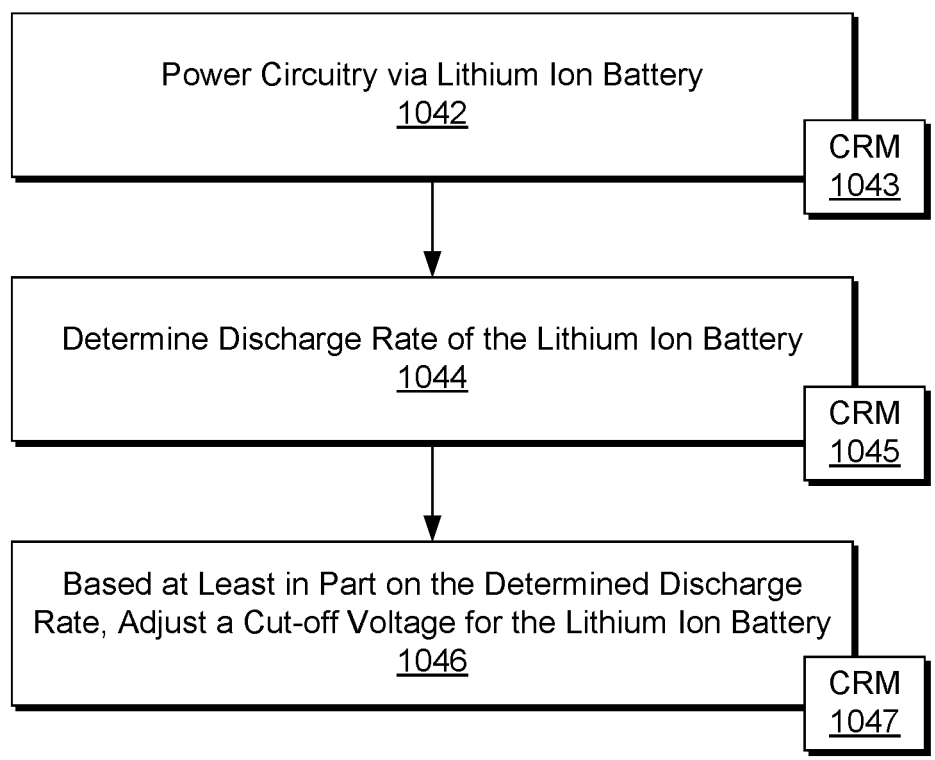

FIG. 10 shows an example of a plot 1000 and an example of a method 1040. The plot 1000 shows approximate voltage with respect to time and various events, which are labeled A, B, C, D, E, F, G, and H. Various events, A-E are associated with circuitry that is consuming power from a battery that is subject to a cut-off voltage. As shown, the event F corresponds to termination of power being provided by the battery as a consequence of the voltage reaching the cut-off voltage (COV). The event G represents a recharge (e.g., charging of the battery) and the event H represents a no-use state of the circuitry. As shown in the plot 1000, the COV may be adjusted in a manner that increases the COV or in a manner that decreases the COV, which can depend on discharge rate as determined by management circuitry (e.g., battery management circuitry).

In the example of FIG. 10, the method 1040 includes a power block 1042 for powering circuitry via a lithium ion battery; a determination block 1044 for, during the powering, determining a discharge rate of the lithium ion battery; and an adjustment block 1046 for, based at least in part on the determined discharge rate, adjusting a cut-off voltage for the lithium ion battery. As an example, the method 1040 may be implemented by a device and/or by a battery assembly to, for example, perform one or more of the operations illustrated with respect to the plot 1000 of FIG. 10.

In the example of FIG. 10, the method 1040 is shown as including one or more computer-readable storage media blocks 1043, 1045 and 1047, which can include processor-executable instructions that instruct a device and/or a battery assembly to perform one or more actions of the method 1040. A computer-readable storage medium is non-transitory, not a signal and not a wave. A computer-readable storage medium is a physical component that can store information such as, for example, processor-executable instructions.

As an example, a method can include powering circuitry via a lithium ion battery; during the powering, determining a discharge rate of the lithium ion battery; and, based at least in part on the determined discharge rate, adjusting a cut-off voltage for the lithium ion battery. In such an example, the adjusting can include decreasing the cut-off voltage. In such an example, the method can, in response to reaching the decreased cut-off voltage, include terminating the powering of the circuitry.

As an example, a determined discharge rate of a method can be an increased discharge rate. In such an example, the method can include adjusting that includes decreasing a cut-off voltage responsive to the increased discharge rate.

As an example, a method can include adjusting that includes increasing a cut-off voltage. In such an example, the method may include, in response to reaching the increased cut-off voltage, terminating powering of circuitry.

As an example, in a method, a determined discharge rate can be a decreased discharge rate where the method includes adjusting that includes increasing a cut-off voltage responsive to the decreased discharge rate.

As an example, a method can include accessing discharge rate and cut-off voltage information and determining a cut-off voltage based at least in part on a determined discharge rate and the accessed discharge rate and cut-off voltage information. In such an example, the method can include adjusting a present cut-off voltage to the determined cut-off voltage.

As an example, a method can include powering circuitry via a lithium ion battery; during the powering, determining a discharge rate of the lithium ion battery; and, based at least in part on the determined discharge rate, adjusting a cut-off voltage for the lithium ion battery where the adjusting the cut-off voltage includes adjusting the cut-off voltage to a value of less than 3 volts or, for example, adjusting the cut-off voltage to a value of less than 3 volts and greater than a predetermined lowermost cut-off voltage limit. As an example, the predetermined lowermost cut-off voltage limit can be less than 2.5 volts and can be greater than 0.5 volts. As an example, a predetermined lowermost cut-off voltage can be based on chemistry such as an OD state for a particular chemistry.

As an example, a method can include powering circuitry via a lithium ion battery; during the powering, determining a discharge rate of the lithium ion battery; and, based at least in part on the determined discharge rate, adjusting a cut-off voltage for the lithium ion battery, where the circuitry includes a processor.

As an example, a method can include powering circuitry via a lithium ion battery; during the powering, determining a discharge rate of the lithium ion battery; and, based at least in part on the determined discharge rate, adjusting a cut-off voltage for the lithium ion battery, where the circuitry includes a display.

As an example, a method can include powering circuitry via a lithium ion battery; during the powering, determining a discharge rate of the lithium ion battery; and, based at least in part on the determined discharge rate, adjusting a cut-off voltage for the lithium ion battery, where the powering includes powering at least one processor operatively coupled to a display and, for example, where the powering includes rendering video to the display.

As an example, a lithium ion battery assembly can include a lithium ion battery; discharge rate circuitry that determines a discharge rate of the lithium ion battery; and cut-off circuitry that adjusts a cut-off voltage for the lithium ion battery based at least in part on the discharge rate. In such an example, the lithium ion battery can power the discharge rate circuitry, the cut-off circuitry or the discharge rate circuitry and the cut-off circuitry.

As an example, an information handling device can include a processor; memory operatively coupled to the processor; a lithium ion battery operatively coupled to the processor and to the memory; discharge rate circuitry that determines a discharge rate of the lithium ion battery; and cut-off circuitry that adjusts a cut-off voltage for the lithium ion battery based at least in part on the discharge rate. In such an example, the information handling device can include a display. As an example, an information handling device (e.g., as above) can include discharge rate and cut-off voltage information stored in memory where cut-off circuitry adjusts a cut-off voltage based at least in part on the discharger rate and cut-off voltage information.

Figure 11:
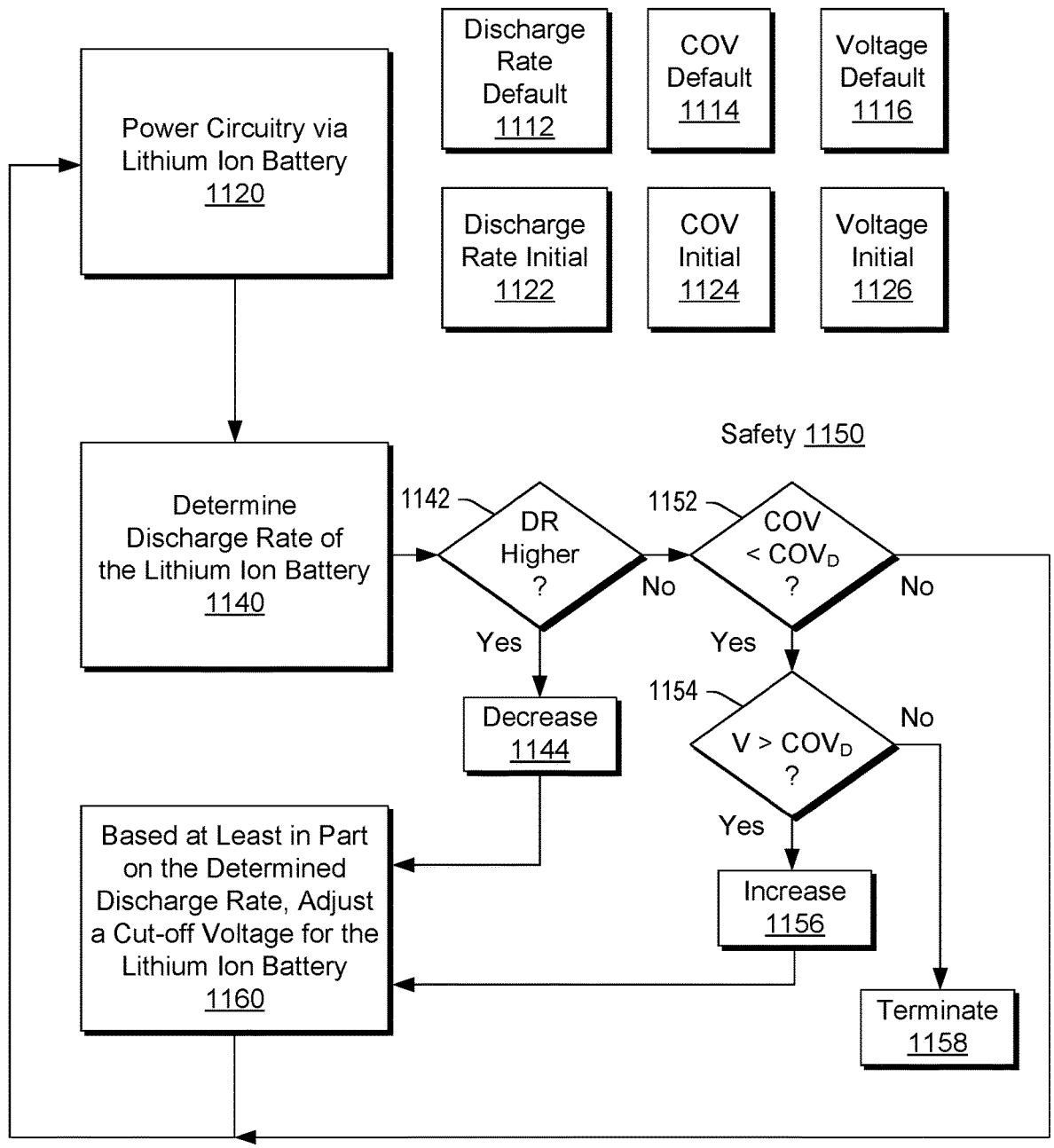
FIG. 11 is a diagram of an example of a method.

FIG. 11 shows an example of a method 1100 that includes various blocks as to default values 1112, 1114 and 1116 and as to initial values 1122, 1124 and 1126 for discharge rate, cut-off voltage (COV) and voltage (V), respectively.

As shown in FIG. 11, the method 1100 includes a power block 1120 for powering circuitry via a lithium ion battery, a determination block 1140 for determining a discharge rate of the lithium ion battery and an adjustment block 1160 for, based at least in part on the determined discharge rate, adjusting a cut-off voltage for the lithium ion battery.

As shown in FIG. 11, the method 1100 can include a decision block 1142 that decides if the discharge rate (DR) is higher, for example, with respect to the discharge rate of the blocks 1112 and/or 1122. If the decision block 1142 decides that the DR is higher, the method 1100 can proceed to a decrease block 1144 that can provide for decreasing the cut-off voltage. For example, the decrease block 1144 may determine an amount by which the cut-off voltage of the block 1114 and/or the block 1124 is to be decreased, which can be provided to the adjustment block 1160 to make the appropriate adjustment to the cut-off voltage.

As shown in FIG. 11, where the method 1100 can include a safety routine 1150, for example, a routine that acts to reduce risk of damage to the lithium ion battery. In the example of FIG. 11, the safety routine 1150 can include a decision block 1152 that operates if the decision block 1142 decides that the DR is not higher. As shown, the decision block 1152 can decide if the cut-off voltage (COV) is less than, for example, the default COV ($COV_D$) of the block 1114. If the decision block 1152 decides that the COV is not less than the $COV_D$, the safety routine 1150 can continue at the power block 1120; otherwise, the safety routine 1150 continues to another decision block 1154, which decides if the voltage (V) is greater than the $COV_D$. As shown, if the voltage is not greater than the $COV_D$, then the safety routine 1150 continues to a termination block 1158, which can provide for terminating powering of the circuitry by the lithium ion battery (e.g., terminating the block 1120); otherwise, the safety routine 1150 can continue to an increase block 1156 that may determine an amount by which the cut-off voltage of the block 1114 and/or the block 1124 is to be increased, which can be provided to the adjustment block 1160 to make the appropriate adjustment to the cut-off voltage.

As an example, the method 1100 may be implemented in a manner to perform one or more operations associated with the plot 1000 of FIG. 10.

Figure 12:
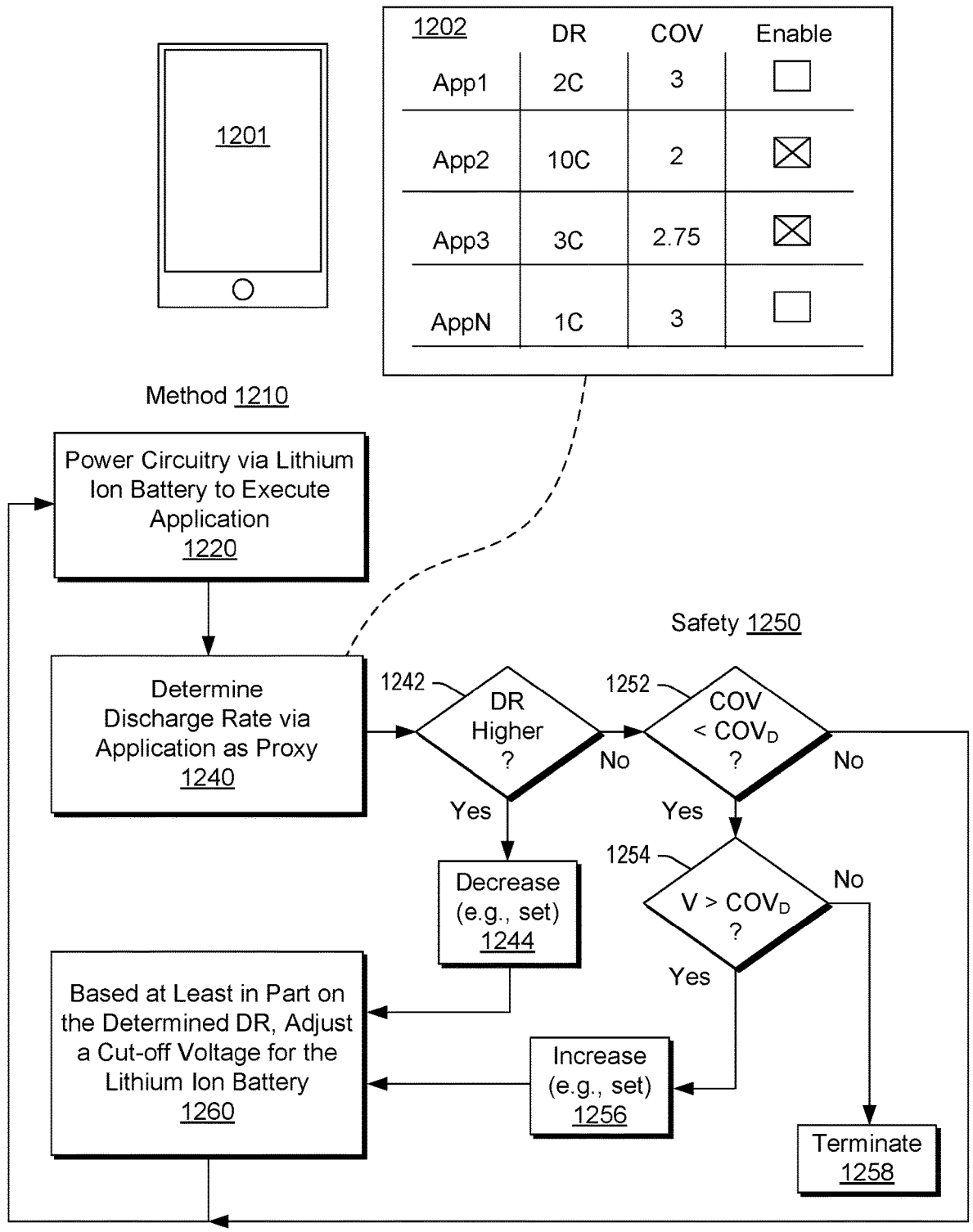
FIG. 12 is a diagram of an example of a method.

FIG. 12 shows an example of a device 1201, information associated with the device 1202, and an example of a method 1210.

As shown in FIG. 12, the method 1210 includes a power block 1220 for powering circuitry via a lithium ion battery to execute an application, a determination block 1240 for determining a discharge rate of the lithium ion battery via the application as a proxy and an adjustment block 1260 for, based at least in part on the determined discharge rate, adjusting a cut-off voltage for the lithium ion battery.

As shown in FIG. 12, the information 1202 can include application information, discharge rate information, cut-off voltage information and, for example, enablement (e.g., and/or disablement) information. As an example, the information 1202 may be rendered to a display of the device 1201, for example, as a graphical user interface (GUI). In such an example, a user may instruct the device 1201 to enable and/or disable one or more of the settings with respect to one or more of the applications (e.g., App1, App2, App3, . . . , AppN).

As an example, the device 1201 may be a learning device in that at least a portion of the information 1202 may be determined via operation of the device 1201 as it executes the various applications, individually and/or in combination. For example, during execution of App2, the device 1201 may learn via circuitry that App2 has a discharge rate of 10 C and, for example, that the COV may be set to approximately 2 V when App2 is executing.

As shown in FIG. 12, the method 1210 can include a decision block 1242 that decides if the discharge rate (DR) is higher, for example, with respect to an initial and/or a default discharge rate (e.g., a DR prior to execution of the application). For example, such a determination may be made at least in part per the information 1202 where the application is one of the applications in the information 1202. If the decision block 1242 decides that the DR is higher, the method 1210 can proceed to a decrease block 1244 that can provide for decreasing the cut-off voltage. For example, the decrease block 1244 may determine an amount by which the cut-off voltage is to be decreased by accessing the information 1202, which can be provided to the adjustment block 1260 to make the appropriate adjustment to the cut-off voltage.

As shown in FIG. 12, where the method 1210 can include a safety routine 1250, for example, a routine that acts to reduce risk of damage to the lithium ion battery. In the example of FIG. 12, the safety routine 1250 can include a decision block 1252 that operates if the decision block 1242 decides that the DR is not higher (e.g., per the information 1202 where the application is one of the applications in the information 1202). As shown, the decision block 1252 can decide if the cut-off voltage (COV) is less than, for example, a default COV ($COV_D$). If the decision block 1252 decides that the COV is not less than the $COV_D$, the safety routine 1250 can continue at the power block 1220; otherwise, the safety routine 1250 continues to another decision block 1254, which decides if the voltage (V) is greater than the $COV_D$. As shown, if the voltage is not greater than the $COV_D$, then the safety routine 1250 continues to a termination block 1258, which can provide for terminating powering of the circuitry by the lithium ion battery (e.g., terminating the block 1220); otherwise, the safety routine 1250 can continue to an increase block 1256 that may determine an amount by which the cut-off voltage is to be increased by accessing the information 1202, which can be provided to the adjustment block 1260 to make the appropriate adjustment to the cut-off voltage.

As an example, the method 1200 may be implemented in a manner to perform one or more operations associated with the plot 1000 of FIG. 10.

Figure 13:
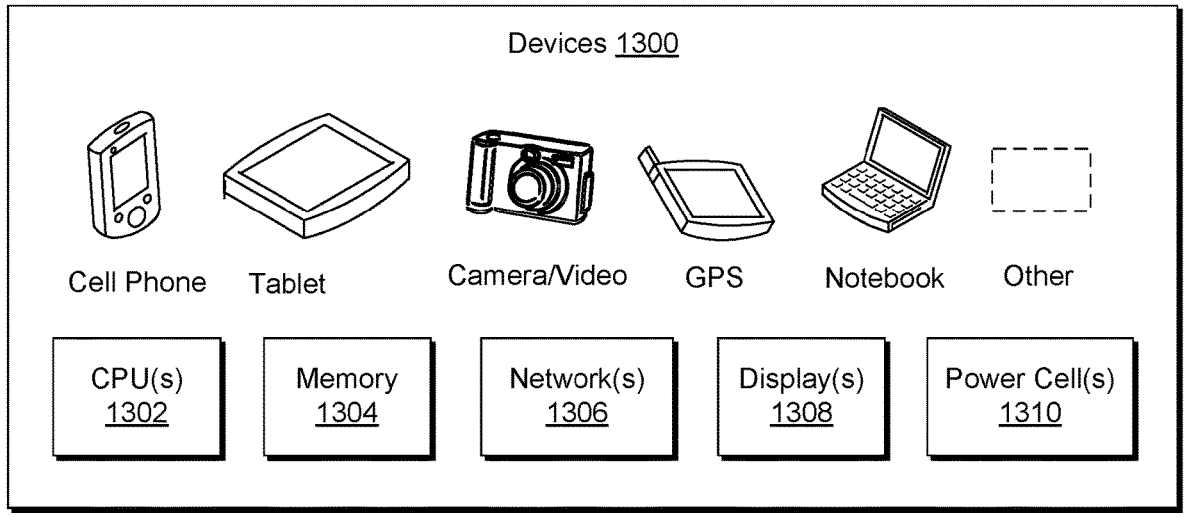
FIG. 13 is a diagram of examples of a devices and examples of circuitry.
Figure 13:
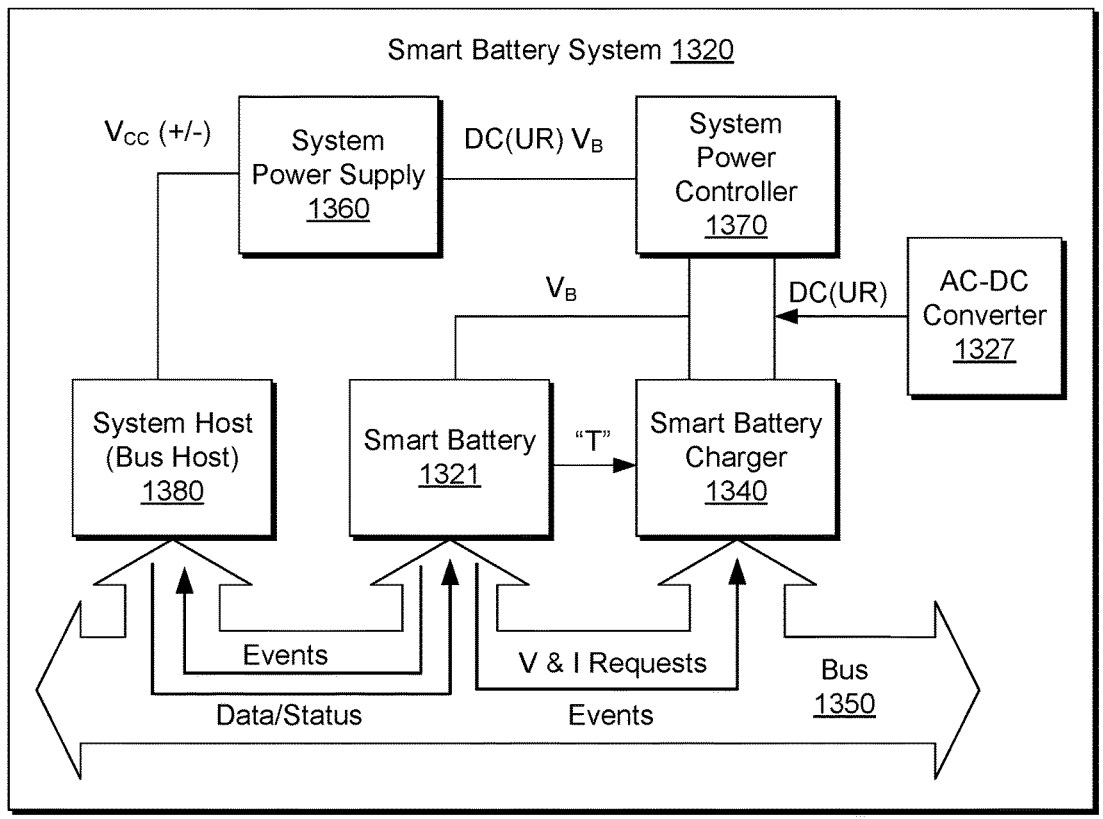

FIG. 13 shows some examples of devices 1300 that can include circuitry that may be powered by a lithium-ion cell or cells and also shows an example of a smart battery system 1320. As to the devices 1300, these can include, for example, a cell phone, a tablet, a camera, a GPS device, a notebook computer, or other device may be powered by a lithium-ion cell or cells. As to other devices, a device may be an electric motor of an electric vehicle or a hybrid vehicle. A device may be an automobile, a toy, a remote control device (e.g., a bomb sniffers, drones, etc.), etc. A device may include one or more processors 1302, memory 1304, one or more network interfaces 1306, one or more displays 1308 and, as a power source, one or more lithium-ion cells 1310.

As to the example smart battery system (SBS) 1320, SBS 1320 includes a smart battery 1321, an AC-DC converter 1327, a smart battery charger 1340, a bus 1350, a system power supply 1360, a system power controller 1370, and a system host 480. The smart battery charger 1340 includes charging circuitry that can provide the smart battery 1321 with charging current and charging voltage.

In the example of FIG. 13, the system host 1380 can include circuitry operable with the bus 1350 that allows for signals to be received from circuitry of the smart battery 1321, signals to be transmitted to the circuitry of the smart battery 1321, signals to be transmitted to the smart battery charger 1340, etc. As an example, the system host 1380 may include a SMBus host (e.g., "2 wire") or a so-called "1 wire" host that can request information from the circuitry of the smart battery 1321, receive information responsive to the request, and transmit the received information to appropriate circuitry of a host.

As an example, one or more of the devices 1300 may include one or more features of the smart battery system 1320. As an example, an assembly can include one or more features of the smart battery system 1320. As an example, an assembly can include one or more batteries (e.g., smart batteries) and circuitry that can acquire information as to discharge rate, which may be able to determine a discharge rate and/or transmit the information to circuitry that can determine a discharge rate. As an example, the SBS 1320 can include circuitry that can determine a discharge rate and that can adjust a cut-off voltage of a battery or batteries based at least in part on the determined discharge rate. In such an example, the bus 1350 may provide information that can be utilized as a proxy for discharge rate and/or as to an indication that a discharge rate may be elevated whereby an adjustment to a cut-off voltage may provide for better utilization of capacity of one or more batteries.

As an example, the SBS 1320 may include one or more features of the circuitry 610 of FIG. 6. For example, the SBS 1320 can include one or more of voltage, current and temperature monitoring circuitry.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable medium that includes computer-executable instructions. As described herein, a computer-readable medium may be a storage device (e.g., a memory card, a storage disk, etc.) and referred to as a computer-readable storage medium. As an example, circuitry can be processor-based in that the circuitry includes a processor (e.g., or processors) and/or is operatively coupled to a processor (e.g., or processors).

Figure 14:
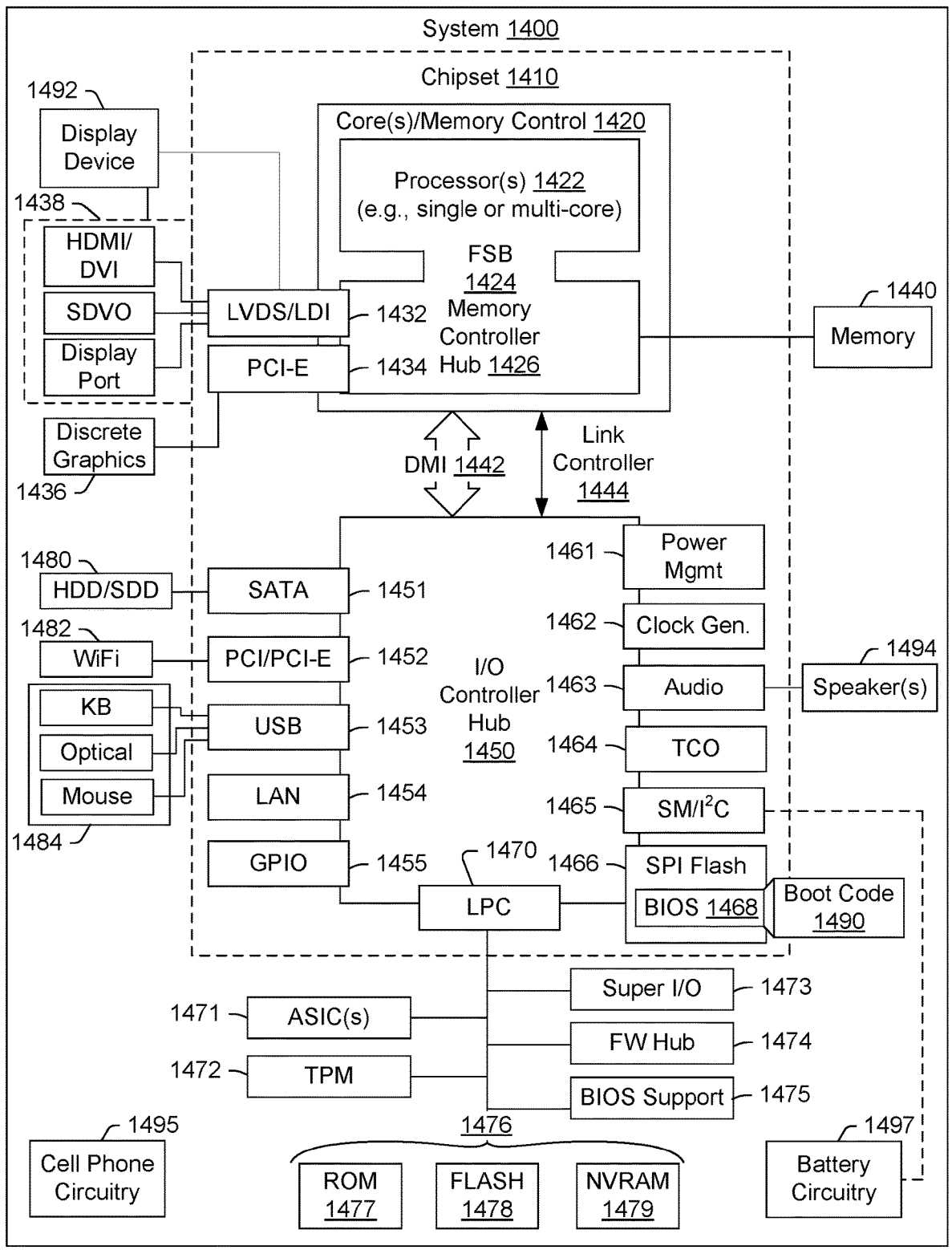
FIG. 14 is a diagram of an example of a system that includes one or more processors.

While various examples of circuits or circuitry have been discussed, FIG. 14 depicts a block diagram of an illustrative computer system 1400. The system 1400 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1400. As described herein, a device such as one of the devices 1300 of FIG. 13 may include at least some of the features of the system 1400.

As shown in FIG. 14, the system 1400 includes a so-called chipset 1410. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As mentioned, a SMBus may be operable via a LPC (see, e.g., the LPC interface 1470), via an I²C interface (see, e.g., the SM/I²C interface 1465), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
powering circuitry via a lithium ion battery, wherein the circuitry comprises a processor and memory, wherein the lithium ion battery comprises a specified capacity and a specified discharge rate, wherein the specified capacity and specified discharge rate determine an expected usage time of the lithium ion battery for a full state of charge;
during the powering, determining a discharge rate of the lithium ion battery;
during the powering, executing an application using the processor and accessing the memory for a discharge rate proxy value for the application, wherein the memory comprises a plurality of discharge rate proxy values for a corresponding plurality of applications; and
based at least in part on a comparison of the determined discharge rate and the discharge rate proxy value, during the powering, adjusting a cut-off voltage for the lithium ion battery.

2. The method of claim 1 wherein the adjusting comprises decreasing the cut-off voltage.

3. The method of claim 2 comprising, in response to reaching the decreased cut-off voltage, terminating the powering of the circuitry.

4. The method of claim 1 wherein the accessed discharge rate proxy value comprises an increased discharge rate compared to the determined discharge rate and wherein the adjusting comprises decreasing the cut-off voltage.

5. The method of claim 1 comprising, after the adjusting, during the powering, determining a decreased discharge rate of the lithium ion battery and increasing the cut-off voltage.

6. The method of claim 5 comprising, in response to reaching the increased cut-off voltage, terminating the powering of the circuitry.

7. The method of claim 1 wherein the accessed discharge rate proxy value comprises a decreased discharge rate compared to the determined discharge rate and wherein the adjusting comprises increasing the cut-off voltage.

8. The method of claim 1 comprising accessing the memory for cut-off voltage information for the application, determining a cut-off voltage based at least in part on the determined discharge rate and the accessed discharge rate proxy value and cut-off voltage information, and wherein the adjusting comprises adjusting the cut-off voltage to the determined cut-off voltage.

9. The method of claim 1 wherein the adjusting the cut-off voltage comprises adjusting the cut-off voltage to a value of less than 3 volts.

10. The method of claim 1 wherein the adjusting the cut-off voltage comprises adjusting the cut-off voltage to a value of less than 3 volts and greater than a predetermined lowermost cut-off voltage limit.

11. The method of claim 10 wherein the predetermined lowermost cut-off voltage limit is less than 2.5 volts and greater than 0.5 volts.

12. The method of claim 1 wherein the circuitry comprises a display.

13. The method of claim 1 wherein the powering comprises powering the processor, wherein the processor is operatively coupled to a display.

14. The method of claim 1 wherein the executing the application using the processor comprises rendering video to a display.

15. The method of claim 1, comprising rendering a graphical user interface to a display operatively coupled to the processor, wherein the graphical user interface comprises fields for at least the plurality of discharge rate proxy values for the corresponding plurality of applications.

16. The method of claim 1, comprising terminating the executing of the application, executing a different one of the plurality of applications and accessing the memory for a different discharge rate proxy value for the different one of the plurality of applications, and, based at least in part on the different discharge rate proxy value, adjusting a cut-off voltage for the lithium ion battery.

* * * * *